United States Patent
Felstaine et al.

(10) Patent No.: US 12,353,509 B1
(45) Date of Patent: Jul. 8, 2025

(54) SYSTEM, METHOD, AND COMPUTER PROGRAM FOR IDENTIFYING A HIDDEN CLASS

(71) Applicant: Amdocs Development Limited, Limassol (CY)

(72) Inventors: Eyal Felstaine, Herzliya (IL); Gad Yitzhak Weissman, Hod Hasharon (IL); Marina Ankri, Karnei Shomron (IL); Nimrod Sandlerman, Ramat Gan (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 1069 days.

(21) Appl. No.: 17/124,331

(22) Filed: Dec. 16, 2020

(51) Int. Cl.
- *G06F 18/214* (2023.01)
- *G06F 18/24* (2023.01)
- *G06N 20/00* (2019.01)
- *G06V 30/242* (2022.01)

(52) U.S. Cl.
CPC .......... *G06F 18/2155* (2023.01); *G06F 18/24* (2023.01); *G06N 20/00* (2019.01); *G06V 30/242* (2022.01)

(58) Field of Classification Search
CPC ..... G06F 18/2155; G06F 18/24; G06N 20/00; G06V 30/242
See application file for complete search history.

(56) References Cited

U.S. PATENT DOCUMENTS

| | | | |
|---|---|---|---|
| 8,700,550 B1 * | 4/2014 | Bickford | G06N 20/00 706/14 |
| 9,202,176 B1 * | 12/2015 | Kapur | G06N 7/01 |
| 10,163,061 B2 * | 12/2018 | Grove | G06N 20/00 |
| 10,209,974 B1 * | 2/2019 | Patton | G06F 8/60 |
| 10,235,443 B2 * | 3/2019 | Hackett-Jones | G06N 3/126 |
| 11,836,530 B2 * | 12/2023 | Zargahi | G06F 9/5044 |
| 2006/0074824 A1 * | 4/2006 | Li | G06F 16/285 706/20 |
| 2008/0071721 A1 * | 3/2008 | Wang | G06N 20/00 706/48 |

(Continued)

FOREIGN PATENT DOCUMENTS

CN 111932583 A * 11/2020

OTHER PUBLICATIONS

Chawla, Nitesh V., et al. "SMOTE: synthetic minority oversampling technique." Journal of artificial intelligence research 16 (2002): 321-357. (Year: 2002).*

*Primary Examiner* — Shahid K Khan
(74) *Attorney, Agent, or Firm* — Zilka-Kotab, P.C.

(57) ABSTRACT

As described herein, a system, method, and computer program are provided for creating a new class of instances. A first dataset comprising a plurality of instances is obtained. A first AI engine is used to classify the plurality of instances into a plurality of classes. Each class of instances of the first dataset is associated with a respective action having a positive result or a lack of the positive result. A class is selected and the respective action is executed on instances of the class. Instances of the selected class for which the respective action resulted in a lack of the positive result are collected. The collection of instances are used to train an AI-model, and/or a second AI engine is used to classify the collection of instances, and/or a plurality of artificial instances are synthesized based on the collection of instances.

9 Claims, 11 Drawing Sheets

(56) References Cited

U.S. PATENT DOCUMENTS

| | | | |
|---|---|---|---|
| 2008/0281764 A1* | 11/2008 | Baxter | G06F 18/214 |
| | | | 706/12 |
| 2015/0379072 A1* | 12/2015 | Dirac | G06N 20/00 |
| | | | 707/693 |
| 2016/0267396 A1* | 9/2016 | Gray | G06N 20/00 |
| 2016/0335548 A1* | 11/2016 | Goh | G06N 3/126 |
| 2017/0124631 A1* | 5/2017 | Bhandari | G06Q 30/0633 |
| 2017/0308802 A1* | 10/2017 | Ramsøy | G06N 20/00 |
| 2017/0316342 A1* | 11/2017 | Franc | G06N 20/10 |
| 2017/0330109 A1* | 11/2017 | Maughan | G06N 5/04 |
| 2017/0372232 A1* | 12/2017 | Maughan | G06F 3/0482 |
| 2018/0018585 A1* | 1/2018 | Marin | G06N 20/00 |
| 2018/0096261 A1* | 4/2018 | Chu | G06N 20/20 |
| 2018/0121815 A1* | 5/2018 | Lamparter | G06N 5/022 |
| 2018/0150546 A1* | 5/2018 | Alexander | G06F 16/2455 |
| 2018/0191770 A1* | 7/2018 | Nachenberg | H04L 63/1441 |
| 2018/0253658 A1* | 9/2018 | Baran | G06Q 50/01 |
| 2019/0156247 A1* | 5/2019 | Faulhaber, Jr. | G06N 3/045 |
| 2019/0279102 A1* | 9/2019 | Cataltepe | G06V 10/80 |
| 2019/0301071 A1* | 10/2019 | Altinier | G06N 7/00 |
| 2019/0339688 A1* | 11/2019 | Cella | H04L 1/18 |
| 2020/0082296 A1* | 3/2020 | Fly | G06N 7/01 |
| 2020/0134367 A1* | 4/2020 | Chopra | G06N 5/01 |
| 2020/0151619 A1* | 5/2020 | Mopur | H04L 67/12 |
| 2020/0193313 A1* | 6/2020 | Ghanta | G06N 20/00 |
| 2021/0021631 A1* | 1/2021 | Okutan | H04L 63/164 |
| 2021/0133610 A1* | 5/2021 | Natesan Ramamurthy | |
| | | | G06N 20/00 |
| 2021/0287136 A1* | 9/2021 | Das | G06Q 20/4016 |
| 2022/0126864 A1* | 4/2022 | Moustafa | B60W 50/14 |
| 2024/0242123 A1* | 7/2024 | Hatakeyama | G06N 5/01 |

* cited by examiner

SYSTEM, METHOD, AND COMPUTER PROGRAM FOR IDENTIFYING A HIDDEN CLASS

FIELD OF THE INVENTION

The present invention relates to the field of artificial intelligence (AI), and, more particularly, but not exclusively, to clustering a new class of an unlabeled dataset, and, more particularly, but not exclusively, to identifying a class hiding within another class.

BACKGROUND

For a given population of 'instances', having a particular distribution, such as, for example, a Gaussian or an exponential distribution, the distribution may be divided into a mainstream part and a tail part. For example, the mainstream part may include the first standard deviation of the distribution, and the tail part may include the rest of the distribution.

An AI system performing unsupervised classification (clustering) of the given population may successfully determine classes of the mainstream part, particularly if the mainstream part includes relatively few classes, each class with a relatively large population. The AI system may fail to determine classes of the tail part, if, for example, it has relatively more classes, each class with a relatively smaller population. From the AI point of view, the division into a mainstream part and tail part may be defined by the AI classification. The part of the population that is successfully classified makes the mainstream part, while the unclassified population makes the tail part.

AI-model drift occurs when the AI-model is used to 'remove' instances from the given population. Hence, the AI-model may fail to recognize instances of the subsequent population as these instances were removed following a previous inferencing action. In other words, the AI model has been trained to recognize and remove instances of the mainstream classes, consequently these mainstream classes have lost their population, and are therefore drifting into the tail part. The AI-model drift may thus be seen as a class drift from the mainstream part to the tail part.

As the entire distribution changes, some classes of the tail part may now drift into the mainstream part. Training a new AI-model may to recognize instances of such class drifting from the tail part into the mainstream part requires the drifting class to grow to sufficient number of instances, which may take much time. There is thus a need to anticipate such drifting class as early as possible.

SUMMARY

As described herein, a system, method, and computer program are provided for creating a new class of instances. A first dataset comprising a plurality of instances is obtained. A first AI engine is used to classify the plurality of instances of the first dataset into a plurality of classes. Each class of instances of the first dataset is associated with a respective action, wherein each action has a positive result or a lack of the positive result. A class of the plurality of classes is selected and the respective action is executed on instances of the class. Instances of the selected class for which the respective action resulted in a lack of the positive result are collected. The collection of instances for which the respective action resulted in a lack of the positive result are used to train an AI-model to recognize at least some of the instances of the collection of instances for which the respective action resulted in a lack of the positive result, and/or a second AI engine is used to classify the collection of instances for which the respective action resulted in a lack of the positive result into a second plurality of second classes, and/or a plurality of artificial instances are synthesized by modifying at least one instance of the collection of instances for which the respective action resulted in a lack of the positive result, wherein the modification changes at least one parameter of the artificial instance away from a characteristic value of a collection of instances for which the respective action resulted in the positive result, and/or a plurality of artificial instances are synthesized by modifying at least one instance of the collection of instances for which the respective action resulted in a lack of the positive result, wherein the modification changes at least one parameter of the artificial instance toward a characteristic value of the collection of instances for which the respective action resulted in a lack of the positive result.

DETAILED DESCRIPTION

Figure 1:
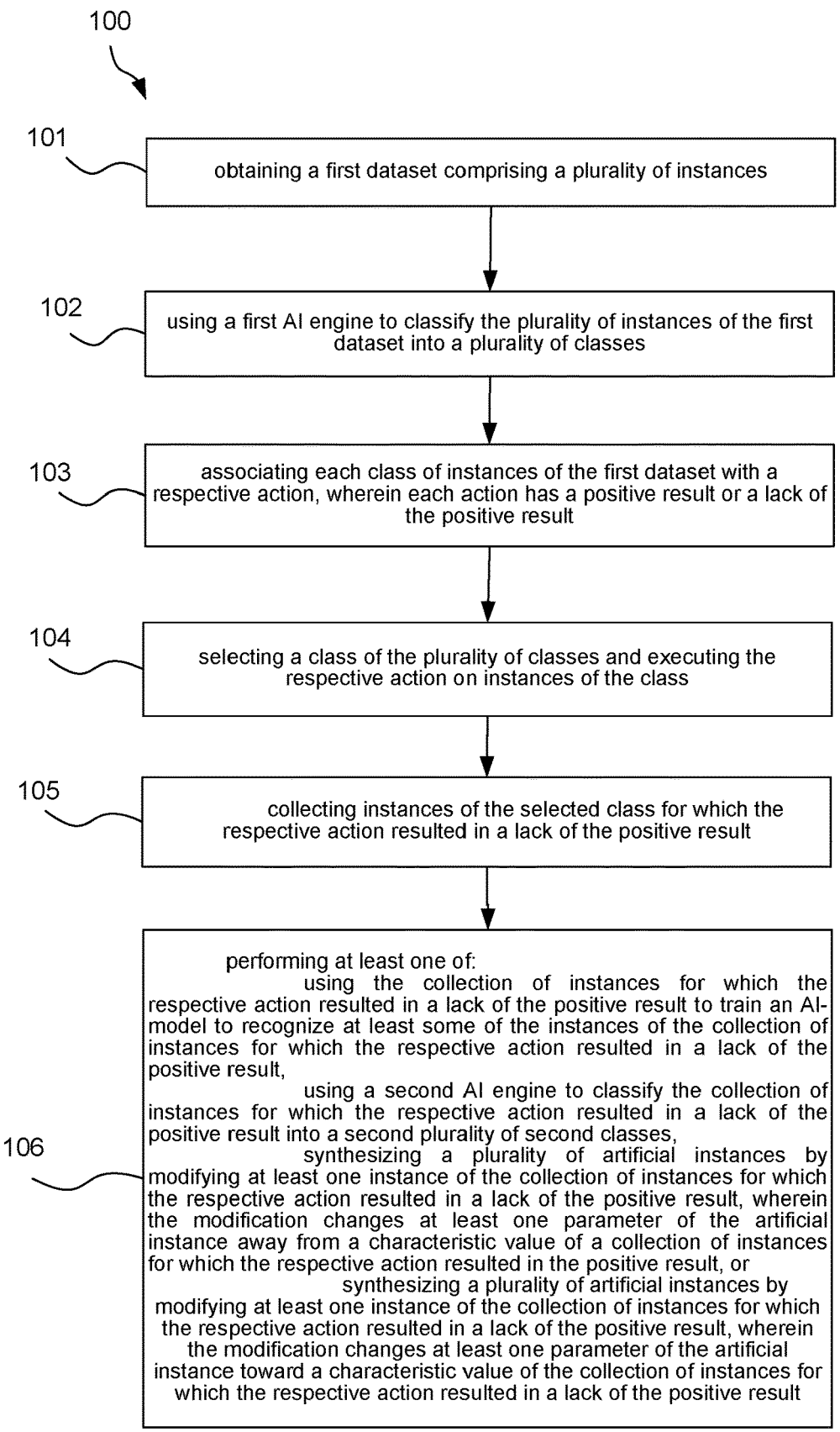
FIG. 1 illustrates a method for creating a new class of instances, in accordance with one embodiment.

FIG. 1 illustrates a method 100 for creating a new class of instances.

In operation 101, a first dataset comprising a plurality of instances is obtained. In operation 102, a first AI engine is used to classify the plurality of instances of the first dataset into a plurality of classes. In operation 103, each class of instances of the first dataset is associated with a respective action, wherein each action has a positive result or a lack of the positive result. In operation 104, a class of the plurality of classes is selected and the respective action is executed on instances of the class. In operation 105, instances of the selected class for which the respective action resulted in a lack of the positive result are collected. In operation 106, the collection of instances for which the respective action resulted in a lack of the positive result are used to train an AI-model to recognize at least some of the instances of the collection of instances for which the respective action resulted in a lack of the positive result, and/or a second AI engine is used to classify the collection of instances for which the respective action resulted in a lack of the positive result into a second plurality of second classes, and/or a plurality of artificial instances are synthesized by modifying at least one instance of the collection of instances for which the respective action resulted in a lack of the positive result, wherein the modification changes at least one parameter of the artificial instance away from a characteristic value of a collection of instances for which the respective action resulted in the positive result, and/or a plurality of artificial instances are synthesized by modifying at least one instance of the collection of instances for which the respective action resulted in a lack of the positive result, wherein the modification changes at least one parameter of the artificial instance toward a characteristic value of the collection of instances for which the respective action resulted in a lack of the positive result.

In one embodiment, the plurality of instances in the first dataset are unlabeled. In another embodiment, all of the classes of instances of the first dataset may be associated with a same action or different actions, or any subset of the classes of instances of the first dataset may be associated with a same action or different actions. In an embodiment, each respective action is a verification process that divides instances of the class into those having the positive result which include a first plurality of successful resolution instances, and into those lacking the positive result which includes a second plurality of false resolution instances.

In an embodiment, the method 100 may additionally include an operation for collecting instances of the selected class for which the respective action resulted in the positive result, and labeling the instances of the selected class for which the respective action resulted in the positive result according to the selected class. In yet another embodiment, instances of the selected class for which the associated action resulted in a lack of the positive result may be determined to not belong to the selected class. In a further embodiment, the selecting, collecting, and performing are repeated for at least one second class of the plurality of classes.

In an embodiment, changing at least one parameter of the artificial instance away from a characteristic value of a collection of instances for which the respective action resulted in the positive result includes changing the at least one parameter to be a value of the characteristic value that is higher than a value of the instance if the value of the instance is higher than a central value, and changing the at least one parameter to be a value of the characteristic value that is lower than a value of the instance if the value of the instance is lower than the central value.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In one embodiment, the purpose of the system and method may be to improve the use of artificial intelligence (AI) analyzing a natural distribution of instances by anticipating the evolution of a new class of instances.

The term 'instance' may refer to any form of data representing a natural object. The instance may have the form of a data record, a string, an image, a streaming content, etc. For example, an instance may be a customer record representing a customer of an operator of a communication network.

The term 'natural distribution of instances' may refer to a collection of a plurality of instances, where the collection may have a plurality of characteristics, and the plurality of instances may be characterized, or sorted, according to the plurality of characteristics, and the association between the plurality of instances and the plurality of characteristics may take the form of some distribution. Particularly, instances of the natural distribution are distributed unevenly among such characteristics.

The term 'characteristic' may refer to any type of parameter that may characterize an instance, or a class of instances. Such parameter, or characteristics, may be identified, or measured, to form a value, or a range of values. An instance, or a class of instances, may therefore be characterized according to a 'characterizing value', or range of values. For example, where all instances of a particular class have respective characteristic value above the characterizing value, or below the characterizing value, or between two characterizing values, or within a particular range of the characterizing value, being a central characterizing value, etc.

Particularly, in one embodiment, the instances of the natural distribution of instances are not labeled, and an AI system is trained to cluster the instances. This action of clustering may create a particular classification, or a plurality of characteristics, according to which the AI system may classify instances of such natural distribution of instances.

Particularly, in one embodiment, the AI system may cluster instances of the natural distribution that apply to large classes, and fail to cluster instances that apply to small classes. Large classes may have a large number of instances that apply to the characteristics of the particular class, and small classes may have a small number of instances that apply to the characteristics of the particular class. Consequently, the AI system may successfully recognize instances of large classes and fail to recognize instances of small classes.

Each instance may have a plurality of characteristics, which can be measured and valued, and the particular distribution of values may associate the particular instance into a particular class.

The term 'mainstream part' may refer to a part of the natural distribution of instances including instances associated with a plurality of large classes, and the term 'tail part' may refer to a part of the natural distribution of instances including all other instances, such as instances of small classes.

Classes of instances, as clustered by the AI system, may overlap, in the sense that instances may be associated with two or more classes. One of the overlapping classes being the class of choice for a particular instance, according to the particular distribution of classification values of the particular instance.

The term 'false positive' may refer to an association of an instance with a wrong class of instances. Identifying false positive recognition of an instance is simple when the instance is properly labeled, but difficult when the instances are unlabeled.

The term 'actionable classification' may refer to associating an instance with a subsequent action that may result in a success or a failure. Such failed subsequent action may result from a prior false classification. The term 'false resolution' may refer to such false classification, or false positive resolution, resulting in a failed associated subsequent action.

The term 'global explainability' may refer to analyzing the AI system classification parameters. For example, the classification parameters may include a plurality of characteristics of the instances of the natural distribution of instances, and a range of values for each such characteristic, where a particular collection of values within such set of ranges of characteristic values, may determine a particular class. For example, by applying a particular set of weights to the values of the characteristics of a particular instance the instance may be classified to a particular class.

The term 'local explainability' may refer to analyzing the AI system classification of a particular instance. For example, by revealing the values of the characteristics of the particular instance, that causes the AI system to classify the particular instance to a particular class.

In this regard, classes may overlap, for example in the sense that the set of characteristic values of a particular instance may be correlated to two or more classes, and particular set of weights may determine the class of choice.

The term 'simulation' and/or 'synthesis' of instances may refer to the creation of new, artificial, instances, which may be based on one or more 'original' instances of the natural distribution of instances. Simulation' and/or synthesis may be achieved, for example, by modifying one or more characteristic values of such original instance to create a new, artificial (simulated, synthesized) instance.

The term 'operator' may refer to an operator of a communication network (also known as 'carrier').

The term 'communication network' or 'network' may refer to any type of electronic network for communicating data between any type of data servers, network servers, network nodes, and any type of terminal equipment. The term 'communication network' or 'network' may refer to networks such as wired telephony service (POTS, PSTN), wireless (mobile, cellular) telephony service (PLMN), satellite communication service (e.g., SATCOM), multi-channel television service via cable, satellite, wireless terrestrial transmission, and/or Internet, multichannel video programming distributor (MVPD), virtual MVPD (vMVPD), Internet service (e.g., via an Internet service provider-ISP or via an wireless Internet service provider-WISP), etc. The term 'communication network' or 'network' may refer to any combination of the above.

The term 'service' may refer to any type of communication service provided to a customer, such as a customer of an operator of a communication network, as well as access to content including transmission, reception, and exchange of content. The term 'content' may refer to any type of text, image, video, three-dimensional (3D) imaging, games (e.g., computer games and/or video games), virtual reality content, augmented reality content, etc.

The term 'content' may refer to any type of text, image, video, three-dimensional (3D) imaging, games (e.g., computer games and/or video games), virtual reality content, augmented reality content, etc.

An operator may provide services to a plurality of customers, where each customer may use a particular plurality (e.g., combination, configuration) of services. The customer and each of the service can be monetized in a plurality of monetization schemes, or a combination of monetization schemes. Each service may be associated with a cost, or a combination of costs, where a particular type of cost may also depend on the usage, as well as temporal distribution of usage, of other services. Additionally, a particular type of cost may also depend on the usage, as well as temporal distribution of usage, of other customers. Therefore, for each particular customer there may be a plurality of different business arrangement (configurations) that may have different respective business results.

The term 'monetizing' may refer to any type of billing or charging or applying revenues (as well as costs, expenditures, etc.) to any particular customer. For example, monetizing may refer to billing periodical (e.g., monthly, annual, etc.), billing by item consumed (e.g., a content item), billing by service consumed (e.g., bandwidth), etc.

The term 'monetizing' may also refer to any type of revenues received from a third party on behalf of the customer. For example, applying revenues from a third party's advertisement to the customer exposed to the advertisement. For example, applying marketing expenditure, such as advertisement and/or promotion by the operator to a customer. For example, applying monetary value for making use of the customer's social activity for promoting the operator or any type of operator's service.

Monetizing may take the form of actual revenues, or cost saving, or credit points. Such credit points may be issued, or charged to, the operator or any third party using a service of the operator.

The term 'bill' or 'billing' may refer to the act of issuing a document to the customer, the document indicating a charge to the customer for the services rendered to the customer by the operator in a previous period of time. The bill may include any number of billing items, each associated with the customer and at least one of the services rendered to the customer, as well as the monetization scheme applied to the particular customer (also known as 'plan', or 'bundle', or 'package', etc.).

The term 'temporal use', particularly with reference to monetizing, may refer to pricing a service according to time-of-day, day-of week, load type and/or load period, etc. The availability of services, particularly service provided by thirds parties, may frequently change. The pricing of any such service may also change, depending on general consumption, local consumption, competition, etc. Therefore, the plurality of business arrangements, as well as their business results to the operator, may change continuously and fast.

The term 'cost' or 'costing' may refer to any type of expenditure incurred by the operator and directly or indirectly associated with a service rendered to a customer. A service provider may provide to each particular customer a plurality of possible services. Each such service may be associated with a direct cost, where the cost of each service may depend on other services provided to the particular customer, as well as one or more services provided to other customers associated with the particular customer. Such association of costs, or cost sharing, may be determined according to the network topology and/or configuration.

Particularly, the term 'cost' may apply to the cost of operating a call-center. Particularly, the term 'cost' may apply to the cost of operating a call-center to deal with a customer call, such as to resolve a problem raised by the customer, particularly a problem associated with a particular billing item.

Further, the term 'cost' may also refer to the cost of customer churn, cost of customer switching, cost of customer retention, etc. Cost associated with a particular customer may also be determined in terms of customer lifetime value, gained, increased, or lost. Hence, an optional resolution to a particular potential call incident associated with a particular billing items may be considered in terms associated with the particular customer. Still further, the term 'cost' may also refer to any type of revenue that may be generated, as well as lost potential revenues associated, such as revenues associated with services that may be offered to a customer.

The term "cost limit", and/or 'cost constraint' may refer to a limit on the cost, and particularly to a limit on the cost of providing a solution, and particularly to a limit on the cost of processing an input and providing a respective output so that the output is useful within a changing environment. It is appreciated that the value of any cost limit and/or cost constraint may change over time. A complex AI processing system may therefore have any number of cost limits and/or cost constraints, some of which may be changing independently of each other.

The terms 'continuously' and 'automatically' may refer to the computing system operating the communication network, or a part thereof, that may, from time to time, determine automatically when to apply to a customer, and what to suggest to the customer, based on a large plurality of 'rules' and at least one parameter provided by the operator (e.g., operator's personnel).

The terms 'artificial intelligence or 'AI' may refer to any type and use of an software program, which may be called 'AI engine', to process a large amount of content or data, which may be called 'a dataset', to produce an 'AI-model', which may be termed here, a 'training action'. In a further action, which may be termed here, an 'inferencing action' tan AI engine using the AI-model may identify, and/or detect, and/or determine, and/or recognize, a particular type of content item, or data item, of the dataset, or a similar dataset.

Typically the AI engine may produce an AI model that can identify a large number of content item types, or data item types. The term 'AI-model' may also be known as a 'predictor'. A 'training AI engine' may use a first dataset to train a particular algorithm to produce a respective AI-model. An 'inference AI engine' may use the AI-model to analyze a second dataset to detect particular data types, or to predict particular situations, etc.

The terms 'artificial intelligence or 'AI' may refer to any type of AI such as machine learning (ML), deep learning (DL), big-data analysis, etc.

The term 'outlier', and/or 'outlier value', and/or 'hidden characteristic', and/or 'subliminal classification', and/or 'missing label', may all refer to a type or class of data records, or a data value, or a range of data values, of such type or class of data records, or a possible label associated with such type or class of data records, and/or data record value, of a dataset. The terms 'subliminal classification', and/or 'hidden characteristic', and/or 'missing label' and/or "outlier value" may be used interchangeably.

Particularly, the term 'outlier' (or any of the other terms disclosed above) may refer to any one or more characteristics of a first dataset, that an AI-model developed for the first dataset, or trained using the first dataset, does not recognize, but a second AI-model developed for the second dataset, or trained using the second dataset, may recognize.

The term 'dataset' may refer to any collection of data, or data records, such as a data-store, or a database. Embodiments herein may refer to a dataset, or a database, of customers of an operator of a communication network. However, it is appreciated that such embodiment may be useful to other types of data, whether such data is associated with customers of an operator of a communication network, such as, for example, billing records, or other data.

The term 'time-limit', and/or 'time-limiting constraint', and/or 'time constraint' may refer to a limit on the time period for processing an input and providing a respective output so that the output is useful within a changing environment. It is appreciated that the value of any particular time-limit may change over time. A complex AI processing system may therefore have any number of time-limits, some of which may be changing independently of each other.

The term 'accuracy' may refer to a measure of the ability of an AI-model to recognize (and/or predict) a particular type of instance (e.g., element, record, event, situation, etc.). There may be several methods for calculating accuracy, for example, based on measuring values such as true positive, true negative, false positive, false negative, etc.

The term 'efficiency' may refer to a measure of the ability of an AI-model to recognize (and/or predict) any type of instance from a given input (population). Efficiency may deteriorate (or decay, or drift, etc.). For example, when the population changes and the types of instances the AI-model has been trained with are no longer present in the input.

The term 'effectiveness' may refer to a measure of the ability of a system to deliver in time the expected result. Effectiveness may be measured, also continuously, for example, based on instance latency. The term 'latency' may refer to the time an instance travels through the processing system from input to output. Effectiveness may be measured in terms of average latency, worst-case latency, percentage of late instances not processed within latency threshold, etc.

The term 'optimization process', and/or 'optimization, and/or 'optimizing', may refer to a process of optimizing a situation, where the situation may be a particular action of processing data. For example, the optimization process may involve the selection of one or more AI-models from a plurality of AI-models, and/or ordering a plurality of AI-models, to achieve an optimization goal.

The optimization goal may involve, for example, at least two opposing requirements and/or restrictions. The goal may be presented as a measure, and/or a function, having at least one maxima and/or minima resulting from the two or more opposing requirements and/or restrictions.

The optimization process may therefore seek a situation, for example, by selecting one or more AI-models from a plurality of AI-models, and/or ordering a plurality of AI-models, for achieving the goal, such as a measure, where, for example, the measure may be above a threshold (for a maximum of a respective function), or below a threshold (for a minimum of a respective function).

The term 'clustering' may refer to an AI process of creating a classification, where the classification includes a plurality of classes, and where the classes of the classification are created according to a training dataset. The term 'inferencing' may refer to an AI process of sorting, or recognizing, a plurality of instances of a dataset into classes of a particular classification. The term 'global explainability' may refer to an AI process of determining characteristics of a classification, and the characteristic values by which the inferencing process may sort instances to each class of the classification. The term 'local explainability' may refer to an AI process of determining characteristic values of a particular inferenced instance.

Figure 2:
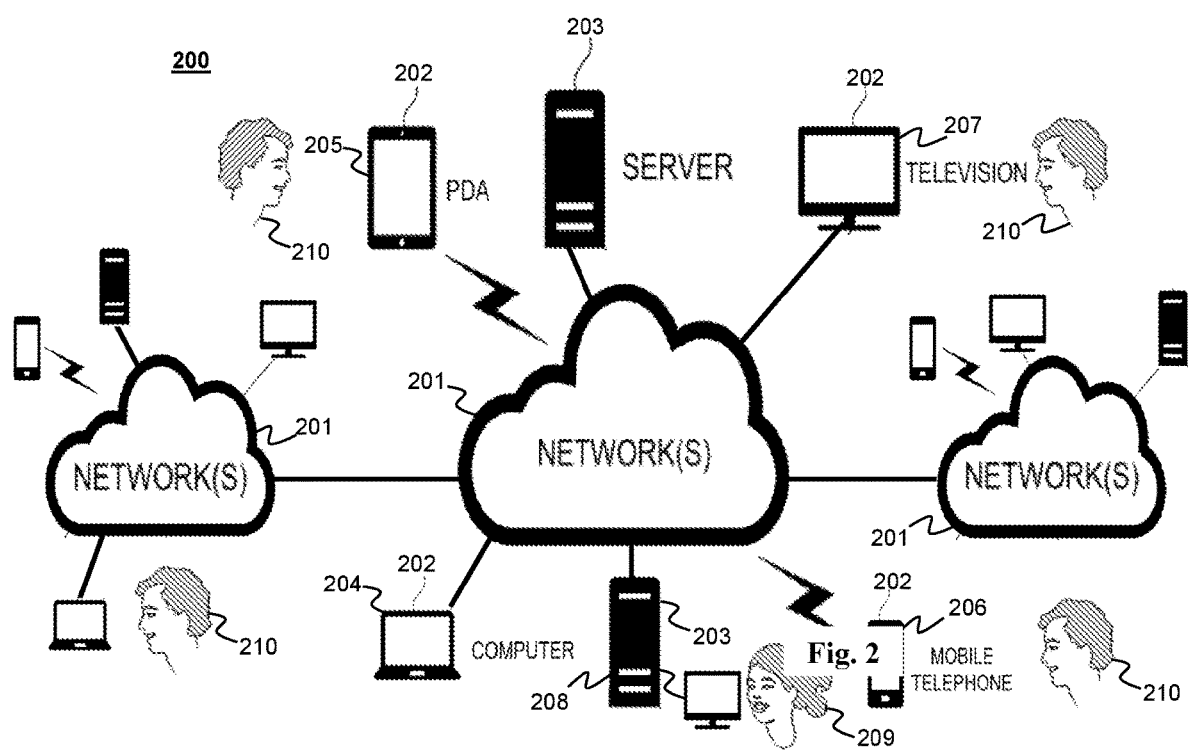
FIG. 2 illustrates a communication network and network architecture, in accordance with one embodiment.

FIG. 2 illustrates a communication network, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

FIG. 2 illustrates a network architecture 200, in accordance with one possible embodiment. As shown, at least one network 201 is provided. In the context of the present network architecture 200, the network 201 may take any form including, but not limited to a telecommunications network, a local area network (LAN), a wireless network, a wide area network (WAN) such as the Internet, peer-to-peer network, cable network, etc. As shown, it should be understood that two or more similar or different networks 201 may be provided.

Coupled to the network 201 is a plurality of devices, such as terminals 202 and servers 203. For example, a server computer 203 and an end user computer 204 may be coupled to the network 201 for communication purposes. Such end user computer 204 may include a desktop computer, lap-top computer, and/or any other type of logic. Still yet, various other devices may be coupled to the network 201 including a personal digital assistant (PDA) device 205, a mobile phone device 206, a television 207, etc. Further, network 201 may be managed by a network management system 208, typically operating on, or executed by, one or more servers 203.

FIG. 2 also illustrates a user 209 and one or more customers 210. User 209 may typically be an administrator of network management system 208. Customer 210 may use any one or more of terminals 2011.

Figure 3:
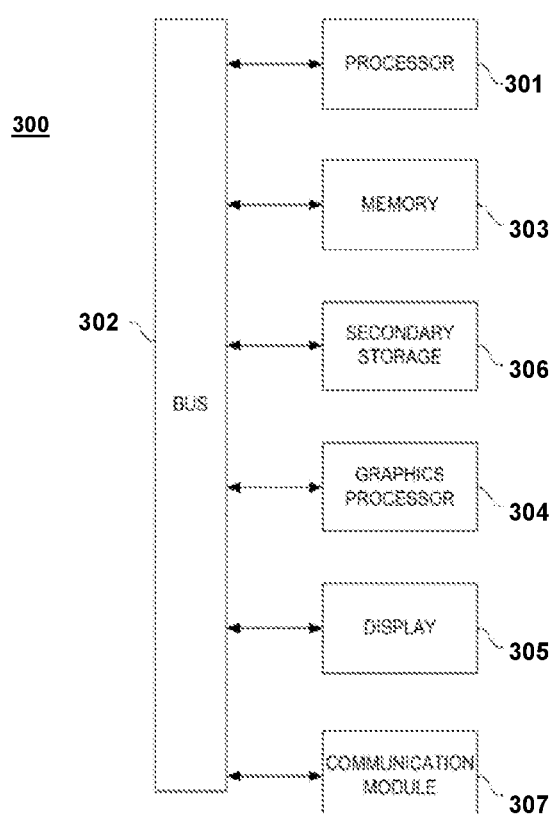
FIG. 3 illustrates an exemplary system in accordance with one embodiment.

FIG. 3 illustrates an exemplary system 300, in accordance with one embodiment. As an option, the system 300 may be implemented in the context of any of the devices and/or servers of the network architecture 200 of FIG. 2. Of course, the system 300 may be implemented in any desired environment.

As shown, a system 300 is provided including at least one central processor 301 which is connected to a communication bus 302. The system 300 also includes main memory 303 [e.g. random access memory (RAM), etc.]. The system 300 also includes a graphics processor 304 and a display 305.

The system 300 may also include a secondary storage 306. The secondary storage 306 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 303, the secondary storage 306, and/or any other memory, for that matter. Such computer programs, when executed, enable the system 300 to perform various functions (as set forth above, for example). Memory 303, storage 306 and/or any other storage are possible examples of non-transitory computer-readable media.

The system 300 may also include one or more communication modules 307. The communication module 307 may be operable to facilitate communication between the system 300 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette: a RAM: a ROM: an erasable programmable read only memory (EPROM or flash memory): optical storage devices, including a portable compact disc (CD), a portable digital video disc (DVD), a high definition DVD (HD-DVD™), a BLU-RAY disc; and the like.

Figure 4:
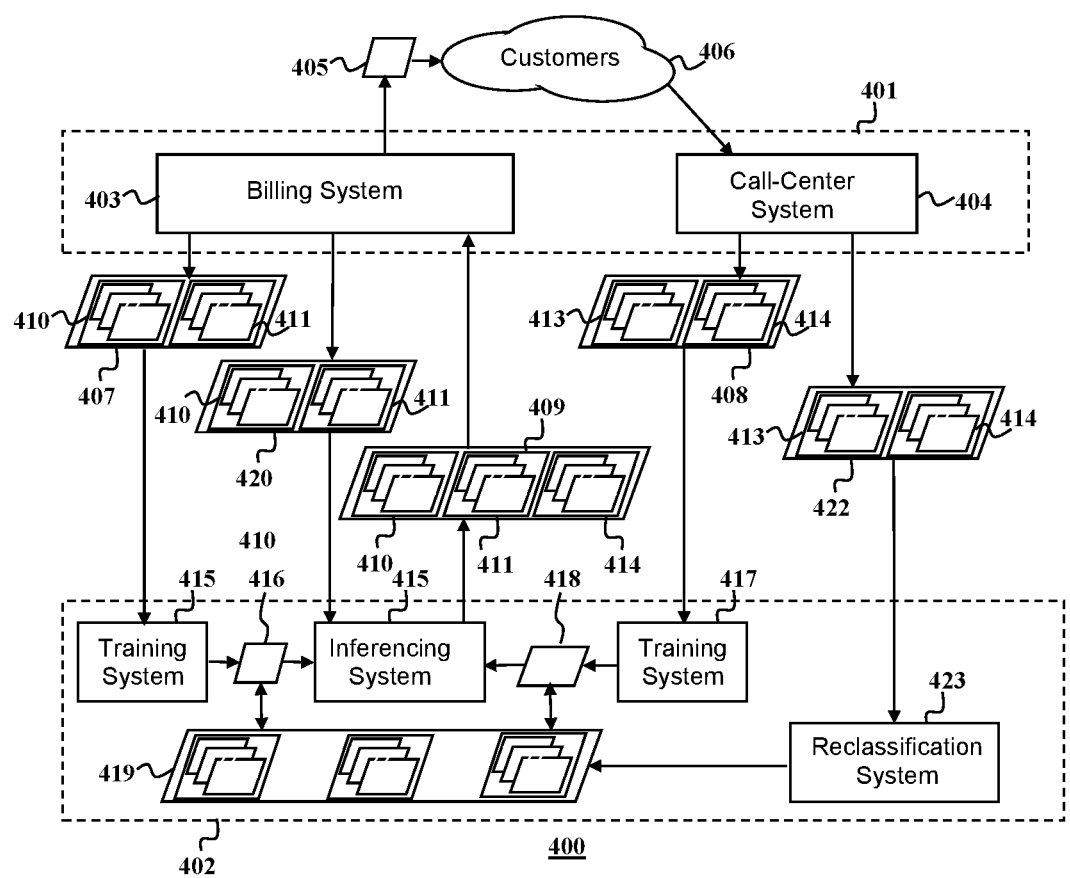
FIG. 4 illustrates a block diagram of a reclassification system and method, in accordance with one embodiment.

FIG. 4 illustrates a block diagram of a reclassification system and method 400, in accordance with one embodiment.

As an option, FIG. 4 and/or reclassification system and method 400 may be implemented in the context of any of the devices and/or servers of the network architecture 200 of FIG. 2 and/or the system 300 of FIG. 3. Of course, the reclassification system and method 400 may be implemented in any desired environment.

Reclassification system and method 400 may include two main parts: a supervised system 401, which may also serve as a verification system, and a supervising system 402, which may use artificial intelligence (AI) technology.

FIG. 4 shows an example of a supervised system 401 that may include a billing system 403, and a call-center system 404. In the example of FIG. 2, billing system 403 may issue bills 405 to customers 406 of an operator of a communication network and related communication services. Some customers 406 may then call call-center system 404 to discuss, for example, a problem associated with a billing item of their respective bills.

Supervising system 402 may then analyze the history 407 of the bills issued by billing system 403, and the history 408 of the customers calls to the call center 404, to determine customers that may call the call-center regarding a problem with a particular billing item. Supervising system 402 may then suggest a resolution 409 for each anticipated problem associated with the particular billing item.

In the example of FIG. 4, the billing history 407 may include, for example, customer records 410 and billing records 411, which may include respective billing items. Call center history 408 may include, for example, customer records 412 and billing records 413 and respective resolutions 414 as may be reached between the call-center agent and the customer of the respective billing record. It is appreciated that both histories may include other records as well.

Following the example of FIG. 4, a first training system 415 of supervising system 402 may analyze billing history 407 to create an AI-model 416 that may classify customer records and billing items to determine pairs of customers and billing items anticipating a problem. A second training system 417 of supervising system 402 may analyze billing history 407 to create an AI-model 418 that may classify customer records, billing items and resolutions to determine triplets of customers, billing items and resolutions to anticipate a resolution to an anticipated problem. All the classifications created by either or both AI-models may be analyzed and stored as classification 419.

As an example, classification 419 may include a classification of customer records, a classification of billing records or items, and a classification of resolutions. However, classification of any type and/or combination of records is contemplated. For example, classification 419 may include instances (records), each representing a pair of a customer record and a billing item that are expected to result in a call to the call-center. For example, classification 419 may include instances (records), each representing a triplet of a customer record, a billing item, and a recommended resolution for the cause resulting in a call to the call-center.

Following the example of FIG. 4, billing system 403 may communicate run-time billing data 420 to supervising system 402. Run-time billing data 420 may include billing records 411 that billing system 403 intends to send to customers of customer records 410.

An inferencing system complex 421 of supervising system 402 may then use inferencing engines using respective AI-models 416 and 418, and may analyze run-time billing data 420 and issue resolution recommendations 409 to billing system 403. In the example of FIG. 4, resolution recommendations 409 may include customer records 410, billing items 411, and recommended resolutions 414.

Billing system 403 may then modify the run-time billing records according to resolution recommendations 409 and send them as billing records 405 to customers 406. Some customers 406 may not be satisfied with the recommended resolution and call the call center, resulting in call event report 422 detailing recommended resolutions 414 that failed along with their respective billing records 413.

A reclassification system 423 of supervising system 402 may then use call event report 422 to determine one or more new classes of classification 419. Details of the operation of supervising system 402 and reclassification system 423 are provided below.

Figure 5:
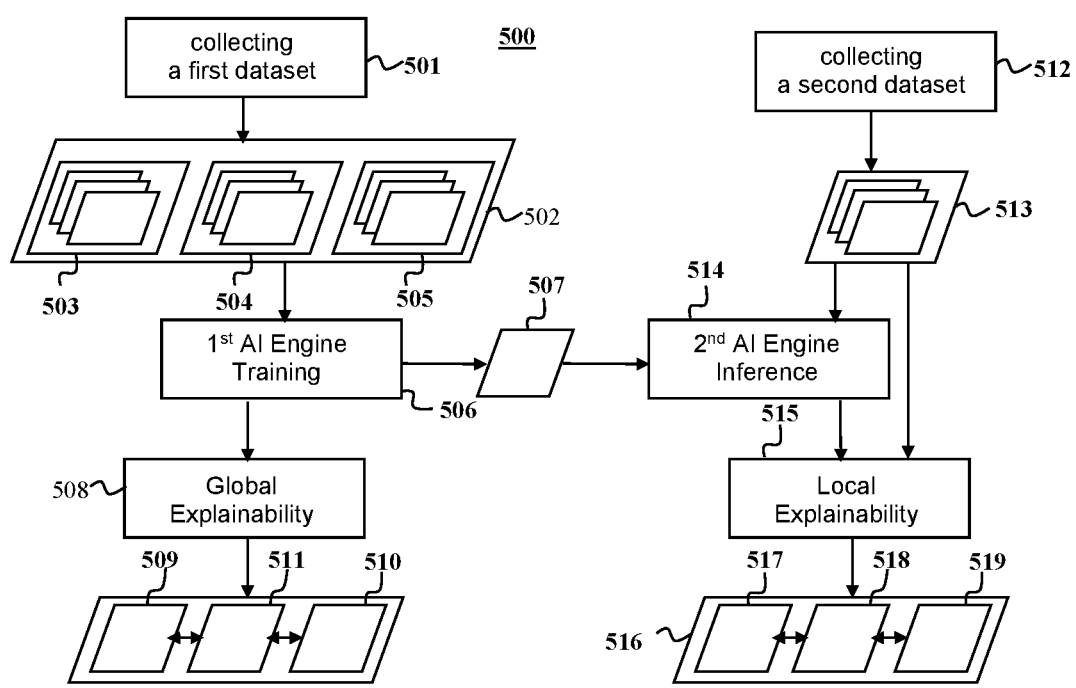
FIG. 5 illustrates a flow chart of a method for determining a billing record to be discussed in a call to a call center, in accordance with one embodiment.

FIG. 5 illustrates a flow chart of a method for determining a billing record to be discussed in a call to a call center, in accordance with one embodiment. The method may be implemented as a computational process 500. The computational process may have the form depicted in a flow-chart presented in FIG. 5.

As an option, FIG. 5 and/or process 500 may be implemented in the context of any of the devices and/or servers of the network architecture 200 of FIG. 2 and/or the system 300 of FIG. 3. Of course, the system and/or process 500 may be implemented in any desired environment.

Process 500 may start in action 501, where process 500 may collect a first dataset 502 Dataset 502 may include of at least one plurality of instances. Instances of each plurality of instances may include the same set of parameters, that may be referred to a features of the type of instance.

Dataset 502 may be produced, for example, by a call-center. In such case dataset 502 may include a plurality of customer records 503, a plurality of billing records 504, and a plurality of call-center incident records 505 (call incident records). Instances of each of these plurality of records may include records having the same set of features.

Each customer record 503 may include a customer identification, and one or more customer parameters (e.g., features). Each billing record 504 may include an identification of the billing record, an identification of the customer for which the bill applies, a billing period, and at least one billing item. A billing item may include an identification of a particular service provided to the customer during the billing period, and the charge applied.

Each call incident record 505 may include an identification of the call incident, a time stamp, an identification of the calling customer, an identification of one or more billing records discussed during the call incident, and an identification of one or more respective billing items discussed during the call incident. A call incident record 505 may also include an identification of a type or class of characterizing a result of the call incident.

Process 500 may then proceed to action 506 to process dataset 502 by a first artificial Intelligence (AI) engine to produce an AI-model 507. AI-model 507 is typically produced by training AI engine 506 with the first dataset 502, which may be produced by a call-center.

The present embodiment may assume a given population of 'instances', having a particular distribution, such as, for example, a Gaussian or an exponential distribution. This may apply to any or all of the pluralities of dataset 502, such as customer records 503, billing record 504, and incident records 505.

The present embodiment may assume that the AI system, such as training AI engine 506, may perform unsupervised classification (clustering) of any given population. Thus, the present embodiment may assume that the distribution may be divided into a mainstream part and a tail part. Typically, mainstream part may include relatively few class where each classes may include a relatively larger number of instances, and a tail part may include relatively many classes where each class may include a relatively smaller number of instances.

The present embodiment may thus assume that the AI system may successfully cluster classes of the mainstream part and may fail to cluster classes of the tail part. It is appreciated that any method of clustering, or unsupervised training, is contemplated, as well as methods of supervised training.

It is appreciated that an operator providing service to a million customers may have a tail part of the customer population that is upwards of 100,000 customers being classified ineffectively, if at all. Namely, the operator cannot make effective use of the classifications of a large part of its customer population. For example, the operator may fail to analyze the response of such customers to their respective bills.

It is appreciated that it is inefficient to try and study such large population one-by-one, and therefore it may be much more useful to learn from successful classification of other operators. However, it is expected that there is still a difference between customers of different operators, particularly in the tail part of the customer populations.

Process 500 may then proceed to action 508 to process global explainability of the AI-model 507. Action 506 together with action 508 may produce customer classifications (types) 509, and billing item classifications (types) 510, as well as a probability matrix 511. Each cell of the probability matrix 511 may represent the probability that a particular pair of customer type (class) 509 and billing item type (class) 510 may result in the customer calling the call-center to discuss the particular billing item.

Process 500 may then proceed to action 512 to collect a second dataset 513 including a plurality of new billing records to be issued to customers. Instances of dataset 513 may include the same set of features as billing records 504 of dataset 502. Consequently, each of the billing records of dataset 513 may refer to a customer record of 503 of dataset 502.

Process 500 may then proceed to action 514 to process the second dataset 513 using the AI-model 507. Action 514 may be a second AI engine, typically an inference machine.

Process 500 may then proceed to action 515 to process local explainability on the output of action 514, so as to provide a report including a plurality of records 516, where each record may indicate a billing record 517 having probability higher than the predefined threshold to cause a customer to call the call-center, an identification of the customer 518 associated with the billing record having probability higher than the predefined threshold, and the billing item type 519 having highest probability to be discussed by the customer in the anticipated call to the call-center.

Figure 6:
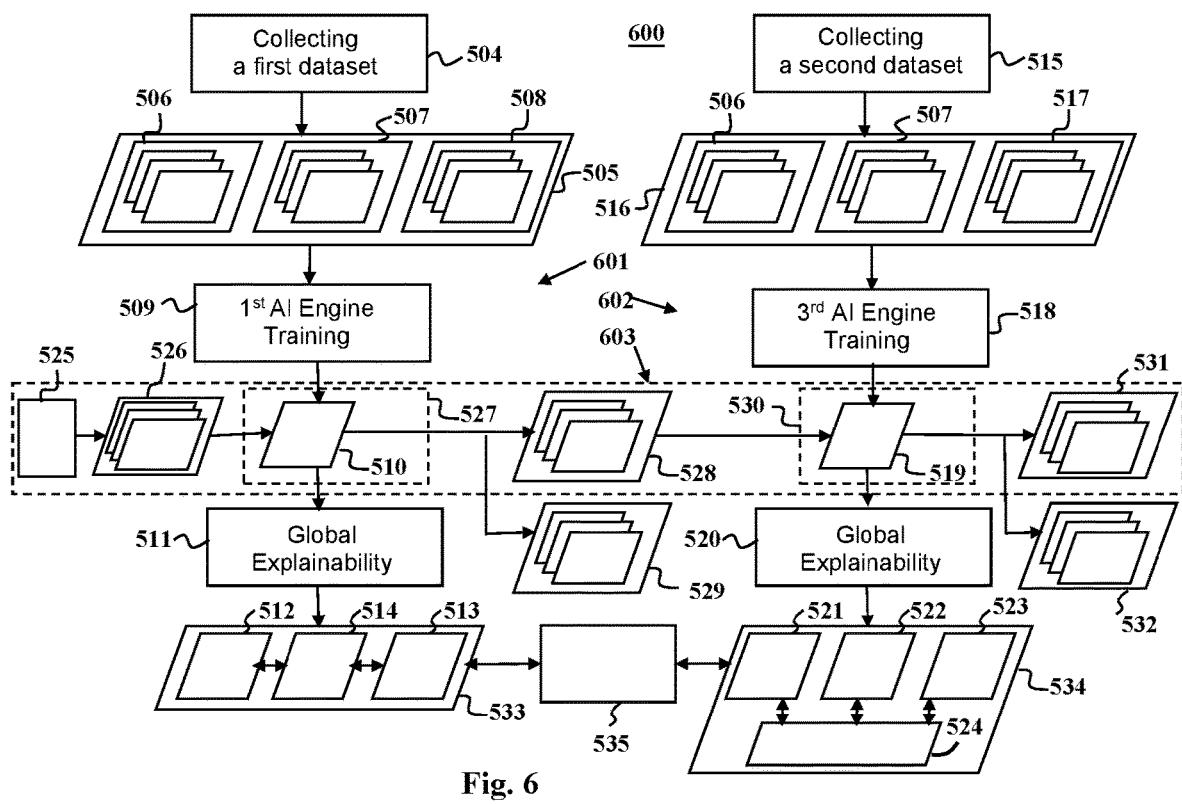
FIG. 6 illustrates a flow chart of a second method and system for determining a billing record to be discussed in a call to a call center, in accordance with one embodiment.

FIG. 6 illustrates a flow chart of a second method and system 600 for determining a billing record to be discussed in a call to a call center, in accordance with one embodiment.

As an option, the method and system 600 may be implemented in the context of any of the devices and/or servers of any of the devices and/or servers of the network architecture 200 of FIG. 2 and/or the system 300 of FIG. 3, or any of the previous Figures. Of course, the method and system 600 may be implemented in any desired environment.

Method and system 600 may include three parts, or processes, a first process 601 a second process 602, and a third process 603, where process 601 may be substantially similar to process 500 as shown and described with reference to FIG. 5.

Process 601 may start in action 504 by collecting a first dataset 505 that may include a plurality of customer records 506, a plurality of billing records 507, and a plurality of call-center incident records 508 (call incident records).

As in Dataset 502, dataset 505 may include at least one plurality of instances. Particularly, dataset 505 may include three such pluralities. Instances of each plurality of instances may include the same set of parameters, that may be referred to a features of the type of instance. A plurality of dataset 505 may include a mainstream part and a tail part as described above with reference to dataset 502.

Each customer record 506 may include a customer identification, and one or more customer parameters. Each billing record 507 may an identification of the billing record, an identification of the customer for which the bill applies, a billing period, and at least one billing item. A billing item may include an identification of a particular service provided to the customer during the billing period, and the charge applied.

Each call incident record 508 may include an identification of the call incident, a time stamp, an identification of the calling customer, an identification of one or more billing records discussed during the call incident, and an identification of one or more respective billing items discussed during the call incident. A call incident record 505 may also include an identification of a type or class of characterizing a result of the call incident.

For example, each of these parameters indicated for each of the record types cited above may be referred to as a feature, and, for example, each of the records (instances) of the same plurality of records (instances), may have the same set of features.

Process 601 may then proceed to action 509 to process dataset 505 by a first AI engine to produce an AI-model 510. In this respect action 509 may be viewed as an AI engine being trained using dataset 505 to produce AI-model 510.

It is appreciated that AI engine 509 may perform unsupervised clustering of any of the above mentioned populations, that any of these populations may have a distribution that may be divided into a mainstream part and a tail part in the sense described above, and that AI engine 509 may successfully cluster classes of the mainstream part and may fail to cluster classes of the tail part. It is appreciated that any method of clustering, or unsupervised training, is contemplated, as well as methods of supervised training.

Process 601 may then proceed to action 511 to process global explainability of the AI-model 510. Action 509 together with action 511 may produce customer classifications (types) 512, and billing classifications (types) and/or billing item classifications (types) 513, as well as a probability matrix 514. Each cell of the probability matrix 514 may represent the probability that a particular pair of customer type (class) 512 and billing item type (class) 513 may result in the customer calling the call-center to discuss the particular billing item.

Process 602, optionally in parallel to process 601, may start in action 515, by collecting a second dataset 516, for example from the call center producing the first dataset 504. Dataset 516 may include a plurality of customer records 506, a plurality of billing records 507, and a plurality of call-center incident records 517 (call incident records) indicating that the discussion with the customer has reached a resolution.

Process 602 may than proceed to action 518 to process dataset 516 by a third AI engine to produce a second AI-model 519. Action 518 may be viewed as an AI engine being trained using dataset 516 to produce AI-model 519.

It is appreciated that the description of dataset 505 and AI engine 509 above with respect to the division of the respective distributions into mainstream part and a tail part, as well as the clustering and classification of the respective distributions, may also apply to dataset 516 and AI engine 518.

Process 602 may than proceed to action 520 to process global explainability of the AI-model 519. Action 518 together with action 520 may produce a plurality of customer classifications (types) 521, plurality of billing classifications (types), and/or billing item classifications 522, and plurality of resolution classifications (types) 523, as well as a probability matrix 524. Each cell of the probability matrix 514 may represent the probability that a particular triplet of customer type (class) 521, billing type (class) 522, and resolution type 523 may result in a resolution to a problem raised by the customer.

Process 603 may be initiated after process 601 and process 602 have produced their respective AI model 510 and AI model 519. Process 603 may start with action 525 to collect a third data set including a plurality of new billing records 526, which may be produced, for example, by an external billing system (not shown in FIG. 6).

Process 603 may then proceed to action 527 to process the third dataset of billing records 526, to produce a fourth dataset 528 including a plurality of records, where each records identified a potential call incident. Namely, that there is a probability surpassing a predetermined probability threshold that a particular customer may call the call-center for an issue associated with the particular billing record. In this respect, action 527 may be viewed as an AI inference machine using AI-model 510 to process dataset 526 to determine potential call incidents provided as dataset 528.

Each record of the fourth dataset 528 may identify a billing record, and preferably also a billing item of the billing record, as well as the customer associated with the billing record, where their combination has a particular probability (greater than the probability threshold) to cause the respective customer to call the call-center.

Each record of the fourth dataset 528 may include a customer identification (or an identification of a customer record), a billing record identification (or an identification of a billing record), and a billing item identification (or an identification of a billing item record).

Action 527 may also produce a dataset 529 of billing records not identifying a problem that may result in the respective customer calling the call-center. Or, alternatively, or additionally, a dataset 529 of billing records for which the probability that the customer may call the call-center for any problem associated with the billing record is below the probability threshold. For example, dataset 529 may include all records of dataset 526 not included in dataset 528.

Process 603 may then proceed to action 530 to process the fourth dataset 528, using AI-model 519, to produce a fifth dataset 531 including a plurality of records, where each records identified a potential resolution to the respective call incident of the respective record of the fourth dataset 528. Namely, that there is a probability surpassing a predetermined probability threshold that a particular resolution may cause the respective customer to avoid calling the call-center for the particular issue associated with the particular billing record. In this respect, action 530 may be viewed as an AI inference machine using AI-model 519 to process dataset 528 to determine potential resolutions to potential call incidents, the potential resolutions may be provided as dataset 531.

Each record of the fifth dataset 531 may include a customer identification (or an identification of a customer record), a billing record identification (or an identification of a billing record), a billing item identification (or an identification of a billing item record), and a resolution type, as well as the probability that the resolution is accepted by the respective customer.

Action 530 may also produce a dataset 532 of billing records not identifying a problem that may result in the respective customer calling the call-center. Or, alternatively, or additionally, a dataset 532 of billing records for which the probability that the customer may call the call-center for any problem associated with the billing record is below the probability threshold. For example, dataset 532 may include all records of dataset 528 not included in dataset 531.

It is appreciated that the fifth dataset 531 may be communicated to the (external) billing system to correct the billing records so as to avoid the anticipated customer's call to the call-center.

It is appreciated that process 603 may be a repetitive process, and/or continuous process, and that the entire method and system 600 may be a repetitive process, and/or continuous process.

It is appreciated that the classification 533 of process 601 may be different from the classification 534 of process 602. For example, the customer types (classes) 512 may be different from the customer types (classes) 521. For example, the billing item types (classes) 513 may be different from the billing item types (classes) 522.

It is appreciated that the fourth dataset 528 may include the classification of the respective customer, and/or billing record, and/or billing item, and that the AI-model 519 may consider these classifications. Hence there may be a motivation to associate the classes (types, labels) of classification 533 with the classes (types, labels) of classification 534. It is appreciated that a fourth process 535 may produce association between each of the classes of classification 533 and each of the classes of classification 534, optionally as a one-to-one (injective) relation.

For example, the classes of the customer classification 512 may be divided, and/or the classes of the customer classification 521 may be divided, or both can be divided, so that each customer class of customer classification 512 has a unique corresponding customer class of customer classification 521. Alternatively or additionally, the classes of the billing record and/or item classification 513 may be divided, and/or the classes of the billing record and/or item classification 522 may be divided, or both can be divided, so that each class of billing record and/or item 513 has a unique corresponding class of billing record and/or item classification 522.

If AI-model 510 is successful in determining billing records, and/or billing items that are likely to cause a call to the call-center, and if AI-model 519 is successful in determining a solution to the problem associated with the billing records and/or billing billing items as determined by AI-model 510, and if these causes for call incidents (customer call to the call-center) are resolved in the bill before it is sent to the customer, then these call incidents will disappear from the data produced by the call-center. The same applies to process 500 of FIG. 5.

In other words, method and system 600 may be executed repeatedly. Particularly, process 603 may process new third dataset of billing records 525, every time such dataset is produced by the billing system. If method and system 600 is successful in avoiding particular types of call incidents than these types of call incidents will not appear in later third dataset of billing records 525, and method and system 600 may have nothing to detect and/or resolve. In other words, the success of method and system 600 is bound to deteriorate the effectiveness of its AI-model 510 and/or AI-model 519. The same applies to process 500 of FIG. 5.

As time passes, the call-center may produce new and/or updated first dataset 505 and/or second dataset 516. Consequently method and system 600 may be repeated from time to time to process the new and/or updated first dataset 505 and/or second dataset 516. For example to train a new or/or updated AI-model 510 and/or AI-model 519, and/or to generate new respective classifications 533 and/or 534. However, if method and system 600 is successful than the causes relevant to the success will disappear from later datasets. Hence, later AI-model 510 and/or AI-model 519 will not be able to detect and/or resolve earlier causes. The term 'earlier causes' may refer to billing problems and/or respective call incidents that earlier AI-model 510 and/or AI-model 519 were able to detect and resolve. The same applies to process 500 of FIG. 5.

First dataset 505 and/or second dataset 516 may be cumulative or periodical. A cumulative dataset 505 and/or 516 may be accumulated over, or produced for, a long period of time to date. A periodical dataset 505 and/or 516 may be produced for a particular period.

Figure 7:
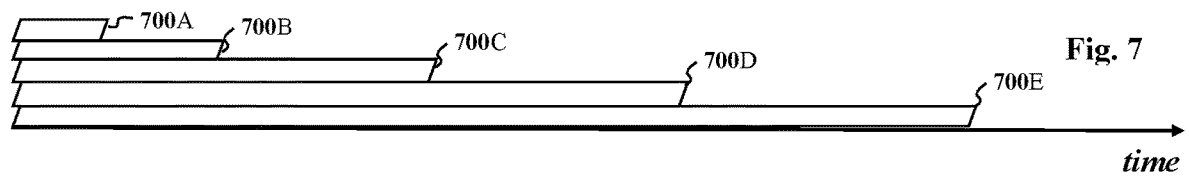
FIG. 7 illustrates a block diagram of a sequence of cumulative datasets, in accordance with one embodiment.
Figure 8:
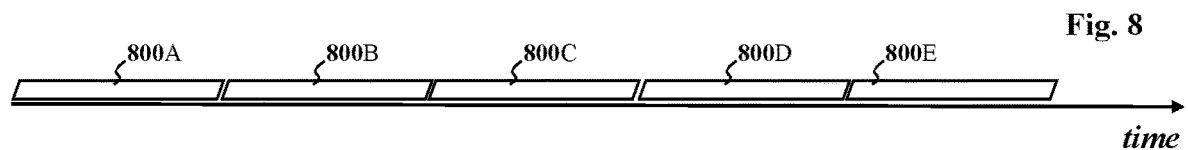
FIG. 8 illustrates a block diagram of a sequence of sequentially periodical datasets, in accordance with one embodiment.
Figure 9:
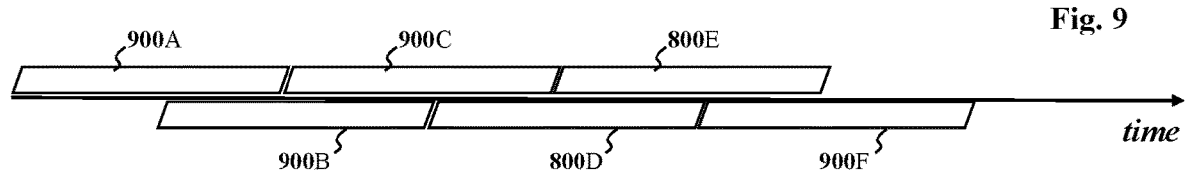
FIG. 9 illustrates a block diagram of a sequence of partially overlapping periodical datasets, in accordance with one embodiment.

FIG. 7 illustrates a block diagram of a sequence of cumulative datasets 700, in accordance with one embodiment. FIG. 8 illustrates a block diagram of a sequence of sequentially periodical datasets 800, in accordance with one embodiment. FIG. 9 illustrates a block diagram of a sequence of partially overlapping periodical datasets 900, in accordance with one embodiment.

As an option, the datasets 700, and/or 800 and/or 900 may be implemented in the context of any of the previous Figures. Of course, the datasets 700, and/or 800 and/or 900 may be implemented in any desired environment.

Any of the datasets 700, and/or 800 and/or 900 may represent any of the datasets 502 and/or 513 of FIG. 5, and/or any of the datasets 505 and/or 516 (as well as dataset 525) of FIG. 6. In other words, for example, dataset 700A represents a sampling A, for example, by actions 504 and/or 515, creating respective datasets 505A and/or 516A, for the same time period A.

Similarly, dataset 700B represents a sampling B (for example, by actions 504 and/or 515) of datasets 505 and/or 516 (as well as dataset 525) of FIG. 6, creating respective datasets 505B and/or 516B.

Similarly, datasets 800A and 800B represent samplings A and B of datasets 505 and/or 516 (as well as dataset 525), and datasets 900A and 900B represent samplings A and B of datasets 505 and/or 516 (as well as dataset 525).

As shown in FIG. 7, datasets 700A, 700B, 700C, 700D, and 700E represent cumulative datasets accumulated over different respective time periods A, B, C, and D. As shown in FIG. 7, datasets 700A, 700B, 700C, 700D, and 700E may start in the same time and end in different times. As disclosed above, each of the datasets 700A, 700B, 700C, 700D, and 700E may represent a respective dataset 502, and/or a dataset 513. Similarly, each of the datasets 700A, 700B, 700C, 700D, and 700E may represent a respective dataset 505 and/or 516 (as well as dataset 525). The same applies to FIGS. 8 and 9.

On one hand, cumulative datasets 700 include all billing records and call incidents, including problems associated with billing items as well as respective resolutions. Therefore, datasets 700 include types call incidents, problems and resolutions that may disappear with time as a result of the success of the method and system 600 (or process 500). Therefore, a process such as method and system 600 for processing datasets 700 is simpler than processing datasets 800 and/or 900. It is appreciated that processing a dataset 700 involves operating all the actions of method and system 600.

On the other hand, the old and fading call incidents, problems and resolutions are slowly diluted withing the later datasets, so that later generated AI-models may not be able to detect them. Further, old data that is not currently useful may be diluting new types of call incidents, problems, and resolutions so that later generated AI-models may not be able to detect the new call incidents, problems, and resolutions.

As shown in FIG. 8, datasets 800A, 800B, 800C, 800D, and 800E represent periodical datasets sampled sequentially over subsequent different time periods. As shown in FIG. 8, each of datasets 800A, 800B, 800C, 800D, and 800E may start after the previous sampling period has ended. Datasets 800A, 800B, 800C, 800D may have any length of sampling time.

As shown in FIG. 9, datasets 900A, 900B, 900C, 900D, 900E, and 900F represent periodical datasets sampled sequentially over partially overlapping different time periods. As shown in FIG. 9, each of datasets 900 may start before a previous sampling period has ended to have a partially overlapping period with at least one previous dataset 900. Datasets 900 may have any length of sampling time. This arrangement of overlapping sampling periods enable longer sampling periods, and hence a dataset including more data records, and yet a higher sampling frequency (e.g., more datasets) as compared with datasets 800 of FIG. 8.

It is appreciated that each of the pair of datasets 505 and 516 for the same sampling period, such as pair 505A and 516A of datasets 700A, the two datasets 505A and 516A may have mutually correlated types (classes), associated by action 535 of FIG. 6. This may apply to all pairs such as datasets 505B and 516B of datasets 800B, datasets 505C and 516C of datasets 900C, etc.

Figure 10:
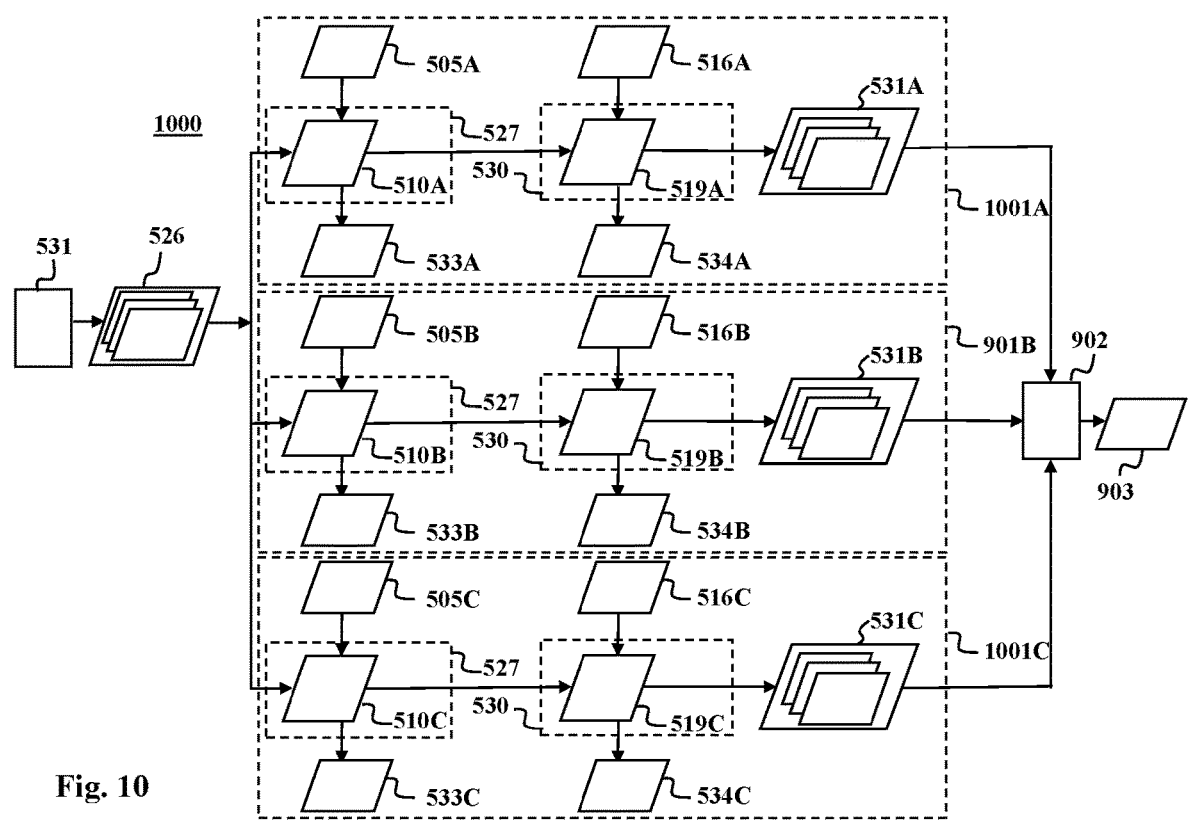
FIG. 10 illustrates a block diagram of method and system for parallel processing of the datasets of FIGS. 8 and 9, in accordance with one embodiment.

FIG. 10 illustrates a block diagram of method and system 1000 for parallel processing of datasets 800 and/or 900, in accordance with one embodiment. As an option, the method and system 1000 may be implemented in the context of any of the previous Figures. Of course, the method and system 1000 may be implemented in any desired environment.

As shown in FIG. 10, method and system 1000 may have a plurality of sub-processes 1001. Method and system 1000 of FIG. 10 shows three sub-processes 1001 enumerated 1001A, 1001B, and 1001C. Each sub-process 1001 represents a complete method and system 600, though only few elements of method and system 600 are shown in FIG. 10. It is appreciated that method and system 1000 may have any number of processes 1001.

As shown in FIG. 10, each of the sub-processes 1001 may be trained with a different dataset 800 or 900, representing a sampling of datasets 505 and/or 516. For example, as shown in FIG. 10, sub-process 1001A may be trained with dataset 800A, which is represented in FIG. 10 as datasets 505A and 516A.

Similarly, sub-process 1001B may be trained with dataset 800B represented in FIG. 10 as datasets 505B and/or 516B. Similarly, sub-process 1001C may be trained with dataset 800C represented in FIG. 10 as datasets 505B and/or 516B.

It is appreciated that method and system 1000 may have any number of processes 1001 processing a respective number of generations A, B, C, D, etc. of periodical datasets 800.

Alternatively, for example, sub-process 1001A may be trained with dataset 900A represented in FIG. 10 as datasets 505A and 516A. Sub-process 1001B may be trained with dataset 900B represented in FIG. 10 as datasets 505B and 516B. And sub-process 1001C may be trained with dataset 900C represented in FIG. 10 as datasets 505C and/or 516C. It is appreciated that method and system 1000 may have any number of processes 1001 processing a respective number of generations A, B, C, D, etc. of periodical datasets 900.

Method and system 1000 may therefore be trained with a plurality of dataset 800 or 900. Thereafter a new input dataset 526, collected from a billing system, may be provided to each of the subprocesses 1001A, 1001B, and 1001C. Thereafter, each of sub-processes 1001A, 1001B, and 1001A may produce a respective output 531A, 531B, and 531C.

It is appreciated that each of the pairs of datasets 505 and 516 for the same sampling period and sub-processes 1001 may have mutually correlated types (classes), as associated by action 535 of FIG. 6. In this respect, datasets 505A and 516A of sub-processes 1001A may have mutually correlated types (classes), associated by action 535 of FIG. 6. Similarly, datasets 505B and 516B of sub-processes 1001B may be mutually correlated types, as well as datasets 505C and 516C of sub-processes 1001C. Therefore, the types (classes) of each such pair of datasets 505 and 516 may be independently correlated.

Optionally and/or additionally, the outputs 531A, 531B, and 531C of processes 1001A, 1001B, and 1001C may be provided to a comparator action 1002. For example, an instance (record) of input dataset 526 may be recognized by two or more processes 1001 producing two respective records 531. These two (or more) records 531 may be compared by comparator action 1002 to select the best for example according to a predefined criterion. The selected records are then provided as the output 1003 of method and system 1000.

The criterion may be, for example, the resolution (solution) having the highest probability of being accepted by the respective customer. Other criteria are contemplated, for example, the combined probability of recognition by the respective pair of AI models 510 and 519.

Figure 11:
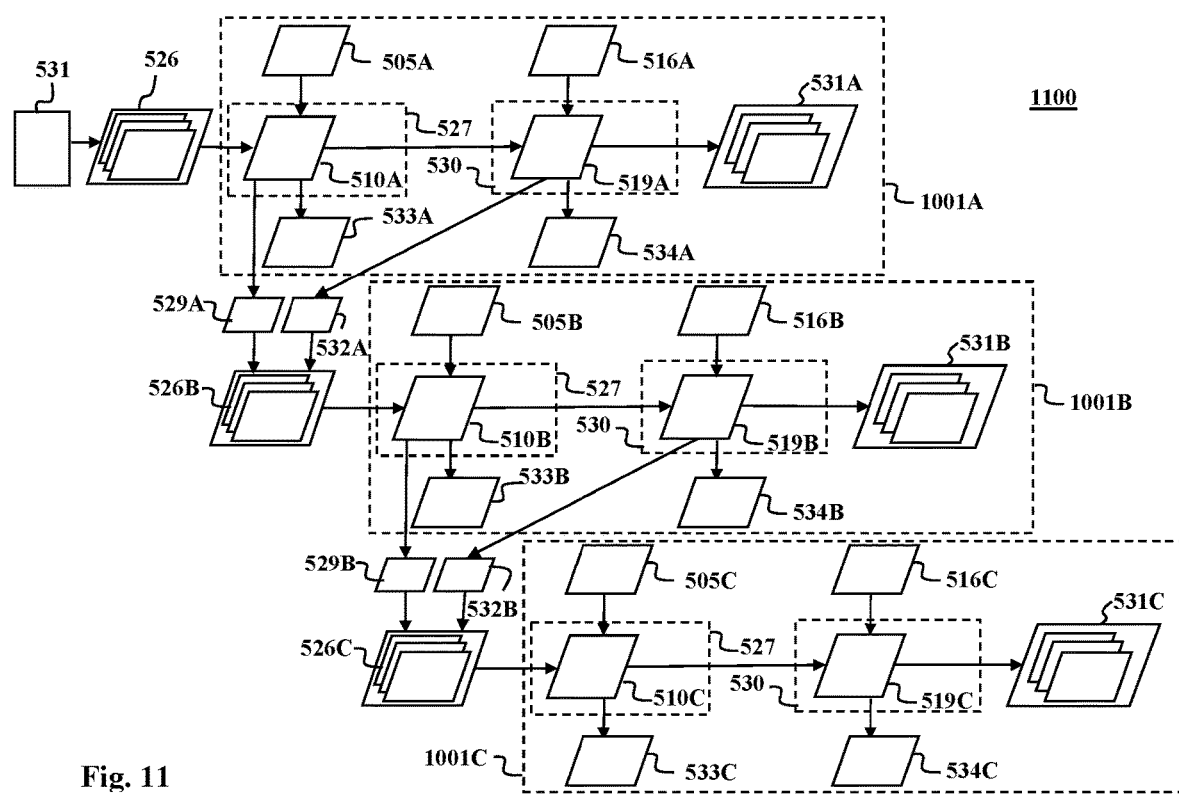
FIG. 11 illustrates a block diagram of method and system for sequential processing of the datasets of FIGS. 8 and 9, in accordance with one embodiment.

FIG. 11 illustrates a block diagram of method and system 1100 for sequential processing of datasets 800 and/or 900, in accordance with one embodiment. As an option, the method and system 1100 may be implemented in the context of any of the previous Figures. Of course, the method and system 1100 may be implemented in any desired environment.

As shown in FIG. 11, method and system 1100 may have a plurality of sub-processes 1001. Method and system 1100 of FIG. 11 shows three sub-processes 1001 enumerated 1001A, 1001B, and 1001C. Each sub-process 1002 represents a complete method and system 600, though only few elements of method and system 600 are shown in FIG. 11.

Each of the sub-processes 1001A, 1001B, and 1001C may be trained by a respective dataset 800A, 800B, 800C, or by a respective dataset 900A, 900B, 900C. Dataset 800A or 900A is represented in FIG. 11 by datasets 505A and 516A, dataset 800B or 900B is represented in FIG. 11 by datasets 505B and 516B, and dataset 800C or 900C is represented in FIG. 11 by datasets 505C and 516C.

The training by dataset 800A or 900A produces the respective AI-models 510A and 519A of 1001A. The training by dataset 800B or 900B produces the respective AI-models 510B and 519B of 1001B. The training by dataset 800C or 900C produces the respective AI-models 510C and 519C of 1001C.

Returning to FIG. 6, Action 527, using AI model 510, may produce a dataset 528 including a plurality of records, where each records identified a potential call incident. Namely, that there is a probability surpassing a predetermined probability threshold that a particular customer may call the call-center for an issue associated with the particular billing record. Dataset 528 (not shown in FIG. 11) may be provided to the input of action 530 to process the fourth dataset 528, using AI-model 519, to produce a fifth dataset 531.

Additionally, action 527 may also produce a dataset 529 of billing records not identifying a problem that may result in the respective customer calling the call-center. Or, alternatively, a dataset 529 of billing records for which the probability that the customer may call the call-center for any problem associated with the billing record is below the probability threshold.

Similarly, action 530, using AI model 519, may produce the fifth dataset 531 including a plurality of records, where each records identified a potential resolution to the respective call incident of the respective record of the fourth dataset 528. Namely, that there is a probability surpassing a predetermined probability threshold that a particular resolution may cause the respective customer to avoid calling the call-center for the particular issue associated with the particular billing record.

Additionally action 530 may also produce dataset 532 of billing records not identifying a problem that may result in the respective customer calling the call-center. Or, alternatively, dataset 532 may include billing records for which the probability that the customer may call the call-center for any problem associated with the billing record is below the probability threshold.

As shown in FIG. 11, dataset 529A, and dataset 532A, produced by sub-process 1001A, may be combined as dataset 526B to be provided to the input of sub-process 1001B. Similarly, dataset 529B, and dataset 532B, produced by sub-process 1001B, may be combined as dataset 526C to be provided to the input of sub-process 1001C, and so on.

It is appreciated that preferably the first sub-process to process that current dataset 526, namely sub-process 1001A, may be trained with the latest dataset of the 800 and/or 900 datasets, namely dataset 800E, or dataset 900F. In other words, datasets 505A and 516A may be derived from dataset 800E, or dataset 900F. The following sub-process 1001B, may be trained with the next latest (penultimate) dataset of the 800 and/or 900 datasets, namely dataset 800D, or dataset 900E. In other words, datasets 505B and 516B may be derived from dataset 800D, or dataset 900E. Consequently, sub-process 1001C, may be trained with the previously sampled dataset of the 800 and/or 900 datasets, namely dataset 800C, or dataset 900D. In other words, datasets 505C and 516C may be derived from dataset 800C, or dataset 900D. In this way only those records that are not determined for cause and/or resolution according to the most current datasets produced by the call-center, are then processed according to datasets produced by the call-center earlier.

It is appreciated that each of the pairs of datasets 505 and 516 for the same sampling period and sub-processes 1001 may have mutually correlated types (classes), as associated by action 535 of FIG. 6. In this respect, datasets 505A and 516A of sub-processes 1001A may have mutually correlated types (classes), associated by action 535 of FIG. 6. Similarly, datasets 505B and 516B of sub-processes 1001B may be mutually correlated types, as well as datasets 505C and 516C of sub-processes 1001C. Therefore, the types (classes) of each such pair of datasets 505 and 516 may be independently correlated.

It is appreciated that the use of any of process 500 of FIG. 5 and/or method and system 600 of FIG. 6, and/or method and system 1000 of FIG. 10, and/or method and system 1100 of FIG. 11, may reduce the cost of operating a call center by detecting, in a bill to be issued to a customer, a potential cause for the customer to call the call center, by determining a potential resolution for the cause to call the call center, and thereafter by amending the bill before it is issued to the customer. Therefore the call incident is avoided and the cost of operating the call center is removed.

The general process of reducing the cost of operating the call center may start by collecting a first dataset including customer calls to a call-center, where each call is related to a particular bill. The dataset includes date and time of the call, customer identification of the customer calling the call-center, complete billing data, the billing item discussed in the call and optionally also billing data not discussed in the call, the result of the call, and cost estimation of the call.

A first AI-model is then developed to characterize and detect pairs of a customer type and a billing item type that have high probability to result in a call to the call center. There are two steps here: the first step involves characterizing the types (customer and bill), and the second step involves the AI model to determine if the particular bill is likely to result in a call to the call center.

A second dataset is collected including actions taken to resolve problems associated with billing items. The dataset includes date and time of the call, customer identification of the customer calling the call-center, complete billing data, the item discussed in the call and optionally also billing data not discussed in the call, the compensation offered to the customer, the compensation accepted by the customer and cost estimation of the compensation accepted by the customer.

A second AI-model is then developed to characterize and detect triplets of a customer type, a billing item type, and the resolution/offer/compensation that have high probability to be accepted by the customer. There are two steps here: the first step involves characterizing the types (customer, billing item, and compensation), and the second step involves the AI model to determine if the customer-billing-item has a candidate compensation.

The actions of developing the first and the second AI-models are iterated until each billing item of billing item types of the first dataset is associated with a billing item of billing item types of the second dataset. Namely, both AI-models can detect respective pairs/triplets for each, and any billing item types. The customer classification/characteristics may be different for the two datasets/AI-models.

Thereafter, the first AI model is used to scan customer bills before they are sent to customers to detect customer-billing-item pairs that surpass a predefined load threshold. The load threshold may be the probability the customer may call the call-center, or the cost expectancy (probability multiplied by the cost of handing the customer call), or the ratio between the cost of handing the customer call and the value of the billing item, etc.

Thereafter, for the customer-billing-item pairs that surpass the predefined load threshold, the second AI model is used to determine possible resolutions (triplets) for each customer-billing-item pair, and to select a preferred resolution, for example, by calculating a selection criterion such as the probability that the customer may concede, or the concession expectancy (concede probability multiplied by the inverse of the cost of the offer), or the ratio between the cost of handing the customer call and the cost of the offer, etc.

The concession expectancy may represent, for example, a combination of probability and cost of resolution. Therefore, for example, the preferred resolution may have a combination of relatively high probability and relatively low cost of resolution. concession expectancy may be calculated, for example, as concede probability multiplied by the inverse of the cost of the offer. In this respect, the inverse of the cost of the offer may be represented, for example, as the value "1" divided by the value of the cost of the offer. Other formulas are also contemplated.

The process described above may be executed in parallel as shown and described above with reference to FIG. 10, for different, temporally dispersed, datasets such as shown and described above with reference to FIG. 7.

Alternatively, the process described above may be executed in a pipeline mode as shown and described above with reference to FIG. 11, for different, temporally dispersed, datasets such as shown and described above with reference to FIG. 8, and/or FIG. 9.

As disclosed above, each of the datasets of FIG. 7, namely datasets 700A, 700B, 700C, etc., may be used to train a respective AI-model 507 of FIG. 5, and/or respective AI-models 510, and/or 519 of FIG. 6. Similarly, each of the datasets of FIG. 8, namely datasets 800A, 800B, 800C, etc., may be used to train a respective AI-model 507A, 507B, and 507C, and/or respective AI-models 510A, 510B, and 510C as well as AI-models 519A, 519B, and 519C. Similarly, each of the datasets of FIG. 9 (namely, datasets 900A, 900B, 900C, etc.,), may be used to train a respective AI-model 507A, 507B, and 507C, and/or respective AI-models 510A, 510B, and 510C as well as AI-models 519A, 519B, and 519C.

A dataset, such as customer records 503, and/or of billing records 504, and/or call-center incident records 505 of FIG. 5, may include a population of instances, for example, in the form of records. The instances of a dataset may have a particular distribution that can be divided into two parts, a mainstream part and a tail part. The tail part may be defined as having types, or classes of instances, or data records representing the instances, having a number of instances (or data records) below a threshold number, or below a threshold percentage of the entire dataset, or where the accuracy of instance recognition by the respective AI-model is below a threshold, etc.

It is appreciated that the tail part may include one or more types of instances that are too few to train the respective AI-model, such as AI-model 507 to recognize such instances as a class of its own. It is appreciated that the same applies to customer record 506, billing record 507, call incident record 508, and call-center incident records 517 of FIG. 6, as well as AI-model 510, and/or AI-model 519.

Two (or more) datasets of the same type, for example, two datasets of customer records 503, may be substantially similar in their mainstream part, but different in their tail part. Such two (or more) datasets may represent customer records (or any other type of records) collected from two different geographical regions, such two (or more) datasets may represent customer records (or any other type of records) collected in different time periods, such as the datasets of FIG. 7, and/or FIG. 8, and/or FIG. 9. Such two (or more) datasets may represent customer records (or any other type of records) collected by different operators.

For example, a tail part of a first dataset of the above two (or more) datasets may have enough instances of a particular type to enable the training of a first AI-model, such as AI-model 507, to recognize instances of the particular type. A second dataset of the above two (or more) datasets may not have enough instances of the particular type so that the respective second AI-model cannot recognize instances of the particular type. However, the first AI-model nay be able to recognize instances of the particular type in the second dataset. Obviously, the above may work the other way round, where the second AI-model may be trained to recognize instances that the first AI-model may not recognize.

Figure 12A:
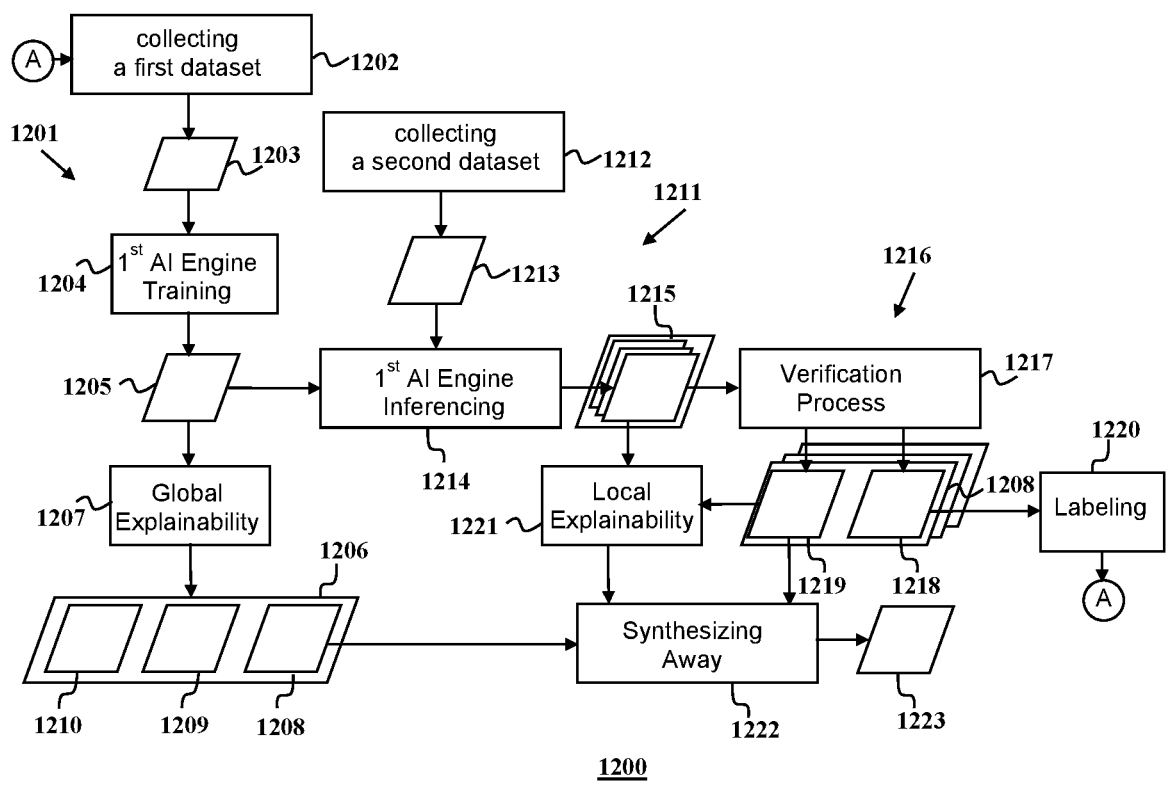
FIGS. 12A-B illustrate a block diagram of a method and system for identifying a class hiding within another class, in accordance with one embodiment.
Figure 12B:
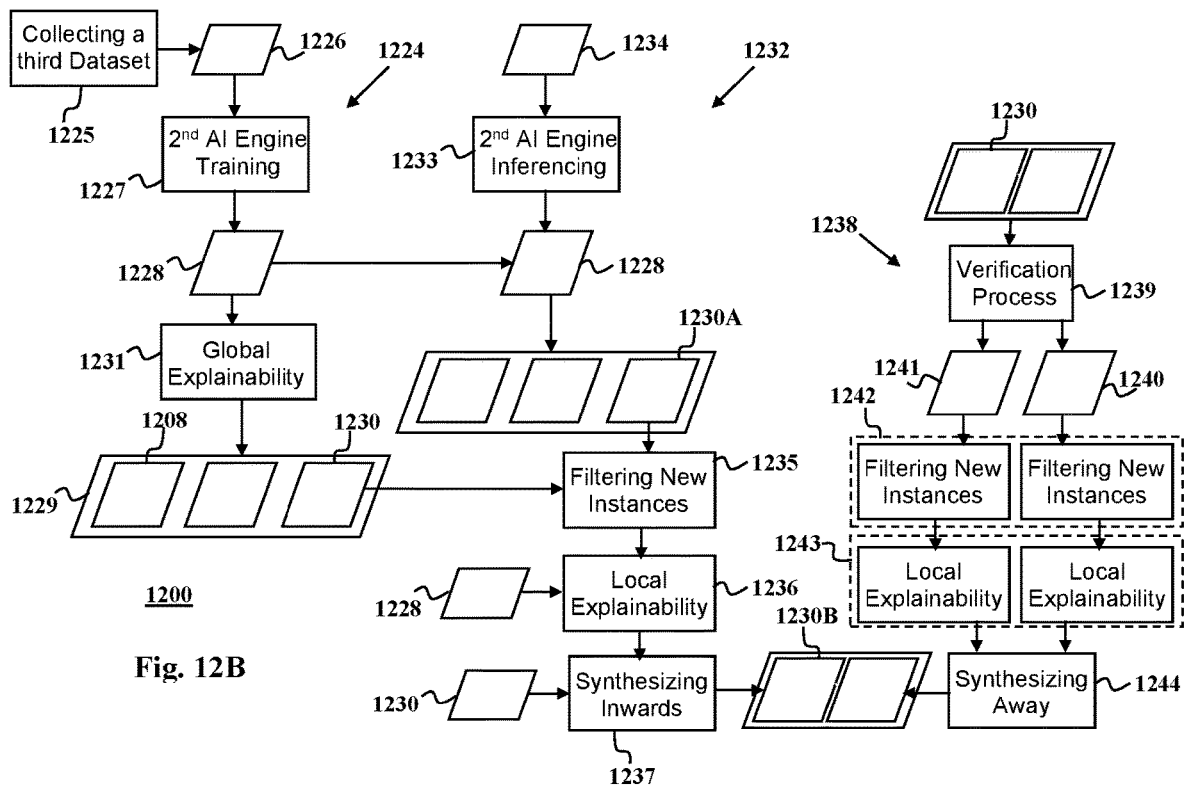

FIG. 12A and FIG. 12B, taken together, illustrate a block diagram of a method and system 1200 for identifying a class hiding within another class, in accordance with one embodiment.

As an option, the method and system 1200 may be implemented in the context of any of the devices and/or servers of any of the devices and/or servers of the network architecture 200 of FIG. 2 and/or the system 300 of FIG. 3, or any of the previous Figures. Of course, the method and system 1200 may be implemented in any desired environment.

Method and system 1200 may have the following subprocess:

Method and system 1200 may start with a first subprocess 1201. First subprocess 1201 may start with action 1202 by collecting a first, "original", dataset 1203. First subprocess 1201 may then train AI engine 1204 to create an AI-model 1205 to cluster instances of the first 'original' dataset 1203 into a first 'base' classification 1206, as determined by global explainability action 1207.

Classification 1206 may include a first plurality of classes of instances of the first 'original' dataset 1203, such as classes 1208 and 1209, as well as a class 1210 of 'unclassified' instances. Classes 1208 and 1209 may represent any number of classes of the mainstream part of classification 1206, while class 1210 may represent any number of classes of the tail part of classification 1206. Instances of class 1210 are 'unclassified' in the sense that the probability of their recognition is low, such as below a predefined threshold of recognition probability.

Method and system 1200 may then continue to a second subprocess 1211. Second subprocess 1211 may start with action 1212 by collecting a second, 'run-time', dataset 1213. Second subprocess 1211 may then proceed to action 1214, using AI-model 1205, to inference the second 'run-time' dataset 1213, producing dataset 1215 including recognized instances of dataset 1213, associated with the respective classes of the first 'base' classification 1206.

It is appreciated that second subprocess 1211 may have used the first 'original' dataset 1203 rather than collect the second 'run-time' dataset 1213. It is appreciated that dataset 1215 could result directly from the operation of first subprocess 1201. The separation into a first process of training and a second 'run-time' process is an example of method and system 1200 as a combination of a batch operation (first subprocess 1201) and a continuous, or repetitive, or online 'run-time' operation (e.g., second subprocess 1211).

Method and system 1200 may then continue to a third subprocess 1216. Third subprocess 1216 may start with a verification process 1217, which may process instances of dataset 1215. The term 'verification process' may refer to any process that may associate each instance of dataset 1215 with a result that may be either true, or positive, or successful, or a result that is false, or negative or failed. Verification process 1217 may therefore produce, for each class of first 'base' classification 1206, a success dataset 1218, and a false resolution dataset 1219. Success dataset 1218 may include instances resulting in true, or positive, or successful result. False resolution dataset 1219 may include instances resulting in false, or negative or failed result.

In this respect, verification process 1217 may include one or more verification actions. Each verification action may be associated with a class of instances, and each class of instances may be associated with a verification action. It is possible that different classes may be associated with different verification actions or the same verification action. In this respect, a class may refer to a combination, or association, of classes of different datasets.

For example, the term class above may refer to a class of customers, associated with a class of billing records, that may be further associated with a class of proposed resolutions, which are together associated with a verification action associated with the proposed resolution. Therefore, the same verification action may be associated with a proposed resolution instance associated with different combinations of customer instance and billing item instance.

As an example, verification process 1217 may be associated with the sequence of actions of FIG. 4 starting with the sending of billing records 405 and resulting in call event report 422, which may correspond to false resolution dataset 1219.

For example, second subprocess 1211 may correspond to method and system 600 shown and described with reference to FIG. 6. Method and system 600 may produce dataset 531 including instances of customers, respective problematic billing items, and a respective resolution to the problem. Verification process 1217 may then correspond to the subsequent operation of a billing system modifying the respective bills according to recommended resolution, and the call-center receiving calls from customers who are not satisfied with the proposed resolution.

Hence, the (billing system and) call-center operating as verification process 1217 may produce at least false resolution dataset 1219 including false resolution instances. Each such false resolution instance may indicate a call event of particular customer calling the call-center because the proposed resolution has failed to satisfy the customer. Such instance of false resolution dataset 1219 may include, for example, a combination of a customer record, a respective problematic billing item, and a respective resolution.

It is appreciated that the second 'run-time' dataset 1213 may be unlabeled. Therefore, it may be impossible to determine for inferencing action 1214 a positive result, or a negative result, or a false positive result, or a false negative result. Determining a 'false resolution' result, such as by verification process 1217, such as the call-events of unsatisfied customers, may indicate a situation similar to a false positive result, though the instance is not labeled.

In this respect, false resolution dataset 1219 may include instances determined by verification process 1217 to be false resolution. Such instances of false resolution are expected not to belong to the respective class of first 'base' classification 1206. Particularly, dataset 1219 may include instances that were classified by inferencing action 1214 into class 1208, but has been determined by verification process 1217 to be false resolution. Therefore, instances of false resolution dataset 1219 may be determined not to belong to class 1208.

It is appreciated that instances of false resolution dataset 1219 may be determined not to belong to any of the mainstream classes of first 'base' classification 1206. Therefore, verification process 1217 may create a plurality of false resolution datasets 1219, where each false resolution dataset 1219 is associated with a respective class of first "base" classification 1206. In this regard, there may be a false resolution dataset 1219 of instances of class 1208, and another false resolution dataset 1219 of instances of class 1209.

Verification process 1217 may also produce success dataset 1218 that may include instances resulting in true, or positive, or successful result. In the example of the billing system and call-center described above with reference to FIGS. 4 to 11, success dataset 1218 may include instances including, for example, a customer record, an associated billing records, an associated billing item, and an associated recommended resolution, where this instance did not result in a call to the call-center, and therefore is assumed to be a successful result.

Hence, instances of success dataset 1218 may be used by labeling process 1220 to label a respective instance (record) of a respective class of the first "original" dataset 1203. The label may confirm that the respective instance (record) of the first 'original' dataset 1203 is properly associated with the respective class of classification the first 'base' classification 1206.

For example, such class may include instances (records), each representing a pair of a customer record and a billing item that are expected to result in a call to the call-center. For example, such class may include instances (records), each representing a triplet of a customer record, a billing item, and a recommended resolution for the cause resulting in a call to the call-center. Hence, instances of success dataset 1218 may confirm the association of the particular instance with the particular class of the first 'original' dataset 1203.

Therefore, the first 'original' dataset 1203 may include classes including instances that are verified and/or confirmed, for example, via success dataset 1218, as well as instances that are not verified and/or confirmed.

Third subprocess 1216 may then process local explainability 1221 to analyze the parameters, or characteristics, of each instance of false resolution dataset 1219, according to the characteristics of its respective class of first 'base' classification 1206.

It is appreciated that AI engine 1204 has created AI-model 1205 to recognize instances of datasets 1203 and/or 1213 according to a respective sets of class characteristics, as determined by global explainability 1207 in classification 1206.

It is therefore appreciated that each class of classification 1206 may be characterized by a respective set of characteristics values, and/or range of values, and respective weights. An instance of datasets 1203 and/or 1213 may then be associated with a particular class if the characteristic values of the particular instance are close enough to the respective characteristics values of the class, and/or within the value range of the respective class characteristic, and according to their respective weights.

It is therefore appreciated that local explainability 1221 may determine that an instance included in false resolution dataset 1219 may have characteristic values properly associated with the respective class of classification 1206, such as class 1208. However, it may be suspected that the particular instance of false resolution dataset 1219 does not belong to the particular class of classification 1206, such as class 1208. It may be further expected that the particular instance of false resolution dataset 1219 may belong to a new class of classification 1206.

The purpose of method and system 1200 may therefore be to train a new AI-model that can also recognize instances of the new class. For this purpose, method and system 1200 may have to collect and/or to synthesize more instances that may belong to the new class.

Method and system 1200 may then synthesize (action 1222) a plurality of new, artificial, instances 1223, based on the characteristics of the particular instance of false resolution dataset 1219 as determined by local explainability 1221, and away from the characteristics of the respective class, such as class 1208, as determined by global explainability 1207.

The term 'synthesizing inwards' may refer to the creation of an artificial instances having a particular set of characteristics according to a respective class (e.g., class 1208), where the value of each characteristic of the artificial instances is set to a representative value, where the representative value is set between the value of the respective characteristics of the particular sample instance (e.g., of false resolution dataset 1219), and the central value of the respective characteristic of the respective class (e.g., class 1208). The central value of the class may be an average value of the instances of the class, or a value representing minimal root-mean-square value, etc.

For example, when 'synthesizing inwards', if the characteristic value of the sample instance of false resolution dataset 1219 of class 1208 is higher than the central value of the respective characteristic of class 1208, then the respective characteristic value of the artificial instances may be set to a value slightly smaller than the characteristic value of the sample instance. For example, if the characteristic value of the sample instance of false resolution dataset 1219 of class 1208 is smaller than the central value of the respective characteristic of class 1208, then the respective characteristic value of the artificial instances may be set to a value slightly higher than the characteristic value of the sample instance.

The term 'synthesizing away' may refer to the creation of an artificial instances having a particular set of characteristics, where the value of each characteristic of the artificial instances is set to a representative value. The representative value may be set away from the value of the respective characteristics of the particular sample instance (e.g., an instance of false resolution dataset 1219), with respect to the central value of the respective characteristic of the respective class (e.g., class 1208), and towards one or more boundary of characteristic values that may be acceptable for the particular characteristic for the particular class, such as class 1208.

For example, when 'synthesizing away', if the characteristic value of the sample instance of false resolution dataset 1219 of class 1208 is higher than the central value of the respective characteristic of class 1208, then the respective characteristic value of the artificial instances may be set to a value slightly higher than the characteristic value of the sample instance. For example, if the characteristic value of the sample instance of false resolution dataset 1219 of class 1208 is smaller than the central value of the respective characteristic of class 1208, then the respective characteristic value of the artificial instances may be set to a value slightly smaller than the characteristic value of the sample instance.

It is appreciated that process 1216 may determine a group of instances of false resolution dataset 1219 that local explainability 1221 may determine to be similar, for example, having similar characteristic values. Particularly such group of similar instances be located within the respective class, such as class 1208, within a range of values in a particular side, such as higher or lower value, of the central value of the respective characteristic of class 1208.

It is appreciated that process 1216 may determine a plurality of groups of instances for each class, such as class 1208. Each such group of instances may include one or more instances of false resolution dataset 1219 for a particular class, such as class 1208, and their respective artificial instances 1223.

Therefore, process 1216 may create a plurality of groups of instances for any number of classes of first "base" classification 1206. Each such class of first 'base' classification 1206 may include one or more groups of instances, each including one or more instances of false resolution dataset 1219 for a particular class and their respective artificial, instances 1223.

Turing to FIG. 12B, method and system 1200 may proceed to fourth subprocess 1224, starting with action 1225 by collecting a third dataset 1226. The third dataset 1226 may include instances of first, original, dataset 1202 that may be likely to be similar to the instances of a particular group of instances resulting from false resolution dataset 1219. For example, such group may include one or more instances of false resolution dataset 1219 for a particular class, such as class 1208, and their respective artificial instances 1223.

For example, the third dataset 1226 may include all the instances of the respective class, such as class 1208. Alternatively, the third dataset 1226 may include only instances of false resolution dataset 1219 for a particular class, such as class 1208. Alternatively, the third dataset 1226 may include instances of false resolution dataset 1219 for several classes that classification 1206 may determine to be similar to the particular class, such as class 1208. Alternatively, the third dataset 1226 may include instances of the tail part of the first "base" classification 1206, such as classes 1210.

Fourth subprocess 1224 may then proceed to action 1227 using a second AI training engine to produce a second AI-model 1228 that may cluster the third dataset 1226 into classification 1229. The purpose of action 1227 is to create at least one class of the third dataset 1226, such as class 1230, that is different from any of the classes of the first 'base' classification 1206. Alternatively, the purpose of action 1227 is to split at least one class of the first 'base' classification 1206, such as class 1208, into at least two classes, such as class 1208 and class 1230.

In some situations, the third dataset 1226 may include labeled instances of one or more classes such as class 1208, which may be obtained from labeling process 1220 via connector "A". Such labeled instances may be used for control purposes, and/or to ensure that instances of class 1230 are distinct from instances of class 1208 being labeled.

Fourth subprocess 1224 may then use global explainability (action 1231) to determine the characteristics of the new classes such as class 1230, as well as the current characteristics of the respective source classes, such as class 1208.

Method and system 1200 may then continue to a fifth subprocess 1232. The fifth subprocess 1232 may use a second inferencing engine 1233, using the second AI-model 1228 to inference a dataset 1234, such as the first 'original' dataset 1203, or the second 'run-time' dataset 1213, or their combination, etc. The second inferencing engine 1233 may therefore produce a plurality of instances of the new classes. For example instances 1230A of class 1230 that are different from the original instances of class 1230 obtained from dataset 1226.

The fifth subprocess 1232 may then filter out (action 1235) the new instances of class 1230 (and/or any other new class of classification 1229) and then use local explainability (action 1236) to determine the characteristic values of the new instances of class 1230. The fifth subprocess 1232 may then synthesize (action 1237) new instances (e.g., instances 1230B) of the respective new class (e.g., class 1230) based on the characteristic values of the new instances of the particular new class (such as class 1230).

In synthesizing action 1237 the fifth subprocess 1232 may execute synthesizing inwards, as described above. Therefore synthesizing action 1237 may produce artificial instances that have characteristic values between the characteristic value of the respective new instance (as filtered in filtering action 1235 and determined in local explainability 1236, and the central characteristics values of the respective class (e.g., class 1230) as determined by global explainability 1231. Therefore, the fifth subprocess 1232 may produce more instances (e.g., instances 1230B) of the new classes (e.g., class 1230).

Method and system 1200 may then continue to a sixth subprocess 1238. The sixth subprocess 1238 may use a verification process 1239 to verify the instances of the new classes such as the new class 1230. In this respect, the verification process 1239 may verify only non-artificial instances of the new classes (such as the new class 1230). The verification process 1239 may be similar to the verification process 1217, however, adapted to the instances of the new class 1230.

Verification process 1239 may provide two types of instances, or datasets. A success dataset 1240 may include instances resulting in true, or positive, or successful result. False resolution dataset 1241 may include instances resulting in false, or negative or failed result.

The sixth subprocess 1238 may then filter (actions 1242), from each of the success dataset 1240, and the false resolution dataset 1241, only the new instances, and use local explainability (actions 1243) to determine their respective characteristic values.

The sixth subprocess 1238 may then synthesize (action 1244) new, artificial, instances of the respective class (e.g., class 1230). For example, synthesizing action 1244 may synthesize the new, artificial, instances based on the characteristic values of the new instances of success dataset 1240, and away from the characteristic values of the instances of the false resolution dataset 1241.

It is appreciated that any two or more of process 1238, 1232, 1224, 1216, 1211, and 1201, may be repeated to increase the number of instances of the respective new class (e.g., class 1230), and to improve the recognition values (such as precision and recall), as well as the verification values. It is appreciated that method and system 1200, or any part of method and system 1200, may be repeated to create more new classes.

It is therefore appreciated that in one embodiment, method and system 1200 may create a classification of a plurality of unlabeled instances, and then determine a plurality of false positive instances for one or more of the classes of the classification, and then cluster at least one additional class within the plurality of false positive instances.

In one other embodiment, method and system 1200 may obtain a first dataset including a plurality of unlabeled instances, and then cluster a first plurality of classes for the first dataset. Method and system 1200 may then determine, from the first dataset, a second dataset including a plurality of true positive instances, as well as a third dataset including instances of the first dataset not included in the second dataset. Method and system 1200 may then label the instances of the second dataset according to their respective classes. Method and system 1200 may then cluster at least one class of the third dataset that differs from all classes of the second dataset.

In one other embodiment, method and system 1200 may create, or use, a verification process that may divide instances of a class of a plurality of unlabeled instances into a first plurality of successful resolution instances, and a second plurality of false resolution instances. Method and system 1200 may then cluster at least one additional class within the plurality of false resolution instances.

In one other embodiment, method and system 1200 may obtain a first dataset comprising a plurality of unlabeled instances, and cluster a first plurality of classes for the first dataset. Method and system 1200 may then determine, from the first dataset, a second dataset comprising a plurality of true positive instances. Method and system 1200 may also determine, for the second dataset, at least one characteristics, and at least one respective central characteristic value. Method and system 1200 may also determine, from the first dataset, at least one false positive instance having the characteristic and a respective instance value. Method and system 1200 may also synthesize at least one artificial instance comprising a value of the characteristics that is higher than the instance value if the instance value is higher than the central value, or lower than the instance value if the instance value is lower than the central value.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for creating a new class of instances, the method comprising:
    obtaining a first dataset comprising a plurality of instances;
    using a first AI model to classify the plurality of instances of the first dataset into a plurality of classes;
    selecting a class of the plurality of classes and executing a respective verification action on instances of the selected class to generate for each of the instances of the selected class a result that is selected from a group consisting of:
        a positive result indicating that the instance is part of the selected class, and
        a lack of the positive result indicating that the instance is not part of the selected class;
    collecting a first subset of instances of the selected class for which the respective verification action resulted in the lack of the positive result;
    identifying the first subset of instances as having less than a threshold number of instances required for training the first AI model to be able to recognize instances in the first subset as being part of a particular class;
    synthesizing a plurality of artificial instances by modifying at least one instance in the first subset of instances for which the respective action resulted in the lack of the positive result, wherein the modification:
        changes at least one parameter of the at least one instance away from a characteristic value of a second subset of instances of the selected class for which the respective action resulted in the positive result, or
        changes at least one parameter of the at least one instance toward a characteristic value of the first subset of instances for which the respective action resulted in the lack of the positive result; and
    combining the plurality of artificial instances and the first subset of instances into a second dataset; and
    training a second AI model to recognize instances in the second dataset as being part of the particular class.

2. The method according to claim 1, wherein the plurality of instances in the first dataset are unlabeled.

3. The method according to claim 2, additionally comprising:

collecting the second subset of instances of the selected class for which the respective action resulted in the positive result; and labeling the instances in the second subset according to the selected class.

4. A non-transitory computer readable medium storing computer code executable by a processor to perform a method for creating a new class of instances comprising:

obtaining a first dataset comprising a plurality of instances;

using a first AI model to classify the plurality of instances of the first dataset into a plurality of classes;

selecting a class of the plurality of classes and executing a respective verification action on instances of the selected class to generate for each of the instances of the selected class a result that is selected from a group consisting of:

a positive result indicating that the instance is part of the selected class, and a lack of the positive result indicating that the instance is not part of the selected class;

collecting a first subset of instances of the selected class for which the respective verification action resulted in the lack of the positive result;

identifying the first subset of instances as having less than a threshold number of instances required for training the first AI model to be able to recognize instances in the first subset as being part of a particular class;

synthesizing a plurality of artificial instances by modifying at least one instance in the first subset of instances for which the respective action resulted in the lack of the positive result, wherein the modification:

changes at least one parameter of the at least one instance away from a characteristic value of a second subset of instances of the selected class for which the respective action resulted in the positive result, or changes at least one parameter of the at least one instance toward a characteristic value of the first subset of instances for which the respective action resulted in the lack of the positive result; and combining the plurality of artificial instances and the first subset of instances into a second dataset; and training a second AI model to recognize instances in the second dataset as being part of the particular class.

5. The non-transitory computer readable medium according to claim 4, wherein the plurality of instances in the first dataset are unlabeled.

6. The non-transitory computer readable medium according to claim 5, additionally comprising:

collecting the second subset of instances of the selected class for which the respective action resulted in the positive result; and labeling the instances in the second subset according to the selected class.

7. A system, comprising:

a non-transitory memory storing instructions; and one or more processors in communication with the non-transitory memory that execute the instructions to perform a method for creating a new class of instances comprising:

obtaining a first dataset comprising a plurality of instances;

using a first AI model to classify the plurality of instances of the first dataset into a plurality of classes;

selecting a class of the plurality of classes and executing a respective verification action on instances of the selected class to generate for each of the instances of the selected class a result that is selected from a group consisting of:

a positive result indicating that the instance is part of the selected class, and a lack of the positive result indicating that the instance is not part of the selected class;

collecting a first subset of instances of the selected class for which the respective verification action resulted in the lack of the positive result;

identifying the first subset of instances as having less than a threshold number of instances required for training the first AI model to be able to recognize instances in the first subset as being part of a particular class;

synthesizing a plurality of artificial instances by modifying at least one instance in the first subset of instances for which the respective action resulted in the lack of the positive result, wherein the modification:

changes at least one parameter of the at least one instance away from a characteristic value of a second subset of instances of the selected class for which the respective action resulted in the positive result, or changes at least one parameter of the at least one instance toward a characteristic value of the first subset of instances for which the respective action resulted in the lack of the positive result; and combining the plurality of artificial instances and the first subset of instances into a second dataset; and training a second AI model to recognize instances in the second dataset as being part of the particular class.

8. The system according to claim 7, wherein the plurality of instances in the first dataset are unlabeled.

9. The system according to claim 8, additionally comprising:

collecting the second subset of instances of the selected class for which the respective action resulted in the positive result; and labeling the instances in the second subset according to the selected class.

* * * * *